(12) United States Patent
Pakulski

(10) Patent No.: US 9,031,280 B2
(45) Date of Patent: May 12, 2015

(54) TEMPORAL-CORRELATIONS-BASED MODE CONNECTION

(75) Inventor: Peter Jan Pakulski, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 13/327,159

(22) Filed: Dec. 15, 2011

(65) Prior Publication Data

US 2012/0163658 A1   Jun. 28, 2012

(30) Foreign Application Priority Data

Dec. 23, 2010   (AU) ................................ 2010257409

(51) Int. Cl.
*G06K 9/00* (2006.01)
*H04N 5/225* (2006.01)
*G06T 7/20* (2006.01)

(52) U.S. Cl.
CPC ............ *G06T 7/2053* (2013.01); *G06T 2200/28* (2013.01); *G06T 2207/10016* (2013.01); *G06T 2207/30196* (2013.01)

(58) Field of Classification Search
None
See application file for complete search history.

(56) References Cited

U.S. PATENT DOCUMENTS

| 7,574,019 | B2 | 8/2009 | Mittal et al. | |
|---|---|---|---|---|
| 2009/0110236 | A1* | 4/2009 | Huang et al. | 382/103 |
| 2011/0025598 | A1* | 2/2011 | Underkoffler et al. | 345/156 |
| 2011/0150282 | A1* | 6/2011 | Gupta | 382/103 |
| 2012/0065948 | A1* | 3/2012 | Tan et al. | 703/2 |
| 2012/0206337 | A1* | 8/2012 | Hildreth et al. | 345/156 |
| 2013/0315444 | A1* | 11/2013 | Hassan-Shafique et al. | 382/103 |
| 2014/0180656 | A1* | 6/2014 | Krebs et al. | 703/2 |

FOREIGN PATENT DOCUMENTS

EP   1984896 B1   8/2011

OTHER PUBLICATIONS

Kyungnam Kim; Thanarat H. Chalidabhongse; David Harwood; Larry Davis. Real-time foreground-background segmentation using codebook model. Real-Time Imaging; Jun. 2005,11; pp. 172-185.

* cited by examiner

*Primary Examiner* — Randolph I Chu

(74) *Attorney, Agent, or Firm* — Canon U.S.A., Inc. IP Division

(57) ABSTRACT

Disclosed herein are a system, method, and computer program product for updating a scene model (230) used for object detection in a video sequence by defining a relationship between a pair of mode models relating to different visual elements of said scene model (230). The method includes the steps of: determining whether the pair of mode models have a temporal correlation with each other, dependent upon a predetermined criterion (745); determining a classification of each mode model in the pair of mode models (740); modifying the relationship between the pair of mode models, dependent upon the determination of the temporal correlation and the determination of the classification (760); and updating the scene model based upon the modified relationship (770).

20 Claims, 21 Drawing Sheets

TEMPORAL-CORRELATIONS-BASED MODE CONNECTION

REFERENCE TO RELATED PATENT APPLICATION(S)

This application claims the benefit of priority under the International (Paris) Convention and under 35 U.S.C. §119 to the filing date of Australian Patent Application No. 2010257409, filed Dec. 23, 2010, hereby incorporated by reference in its entirety as if fully set forth herein.

TECHNICAL FIELD

The present disclosure relates to object detection in video images and, in particular, to foreground/background separation using scene modelling.

BACKGROUND

A video is a sequence of images. The images are also referred to as frames. The terms 'frame' and 'image' are used interchangeably throughout this specification to describe a single image in an image sequence. An image is made up of visual elements. Visual elements may be, for example, pixels or 8×8 DCT (Discrete Cosine Transform) blocks, as used in JPEG images.

Scene modelling, also known as background modelling, involves the modelling of the visual content of a scene, based on an image sequence depicting the scene. The content typically includes foreground content and background content, for which a distinction or separation of the two is often desired.

A common approach to foreground/background segmentation is background subtraction. Background subtraction allows a video analysis system to distinguish between transient foreground objects and the non-transient background, through a differencing operation. For example, a scene model may maintain a number of mode models for each block location of an input video frame, where each block location corresponds to a visual element. The description of a mode model is compared against the description of the current visual element at the corresponding location in the frame. The description may include, for example, information relating to pixel values or DCT coefficients. If the current visual element is similar to at least one of the mode models, the visual element is considered to belong to background. Otherwise, the visual element is considered to belong to a foreground object.

One method uses an initial classification, in the manner described above, to determine whether a visual element belongs to the background or to a foreground object, and then uses this determination as input to a final classification step. In the final classification step, this approach computes a final classification score for each visual element by taking into account the initial classification of the visual elements, correlated to neighbouring visual element to be classified. The challenge is to obtain the correlation between visual elements.

Another method of scene modelling uses full-frame cross-correlation between visual elements. In this method, the scene model contains a correlation of the visual elements that represent dynamic texture areas in the frames. The correlation model uses the difference between a frame and a prediction of that frame obtained from a preceding frame. This correlation model is learned from the frame transitions in a training sequence. Two areas of the scene transitioning at the same time will have the same correlation coefficient, regardless of other parameters associated with those two areas of the scene. This method requires training data, which presents a difficulty because appropriate training data is not always available.

In yet another method, a correlation is computed by comparing temporal characteristics. The temporal characteristics record information at each visual element. Examples of temporal characteristics are activity count (number of times the background model was considered representative for the input visual element), creation time (time stamp or frame number corresponding to the creation of the background model), or reappearance time (last time the background model was found not to be representative for the input visual element).

In particular, one method uses an activity count to assist in the classification. Two background mode models are correlated if the difference between the respective activity counts is smaller than a predetermined threshold. When a foreground object remains in the scene depicted in a video sequence and only a part of the object is moving, then new mode models will be created for the moving parts, whereas the same mode models will match the non-moving parts. In this situation, the activity count difference between the mode models representing the moving part and the mode models representing the non-moving part will be large. Consequently, these mode models will not correlate as desired, even though these mode models represent the same real world object.

Thus, a need exists for an improved method for video object detection in video image processing.

When a set of foreground visual elements have been identified, it is valuable to know what is "behind" that foreground. This information can be used to assist in foreground matting, to assist in frame matching for image alignment, or simply as a visual aid to a user.

One method of identifying the background is to take the oldest background mode models from each visual element model. In cases where the foreground simply occludes an established long-term or initialised background, this method will work. However, in a case where the region behind the current foreground has changed, the background returned will be false. For example, consider a scene that is initialised as empty (at t=0 s), and a car enters and parks at some later time, say t=30 s. At a still later time, say t=60 s, the car is considered to be part of the background. At a still-later time, say t=90 s, a person walks past occluding the car. The oldest background will be from t=0 s, and the background returned will not include the car, even though the car is, at t=90 s, part of the background.

Another method is to use a threshold time. For the previous example, if the threshold used is time t=60 s, then the correct background will be returned when the person walks past the car. The problem with such a method is the selection of an appropriate threshold, which will depend on the situation and the task. If an incorrect threshold time is used, say t=30 s, an incorrect background will be returned. The problem simply changes to one of finding an appropriate threshold time, and there are situations where no such threshold time exists, for example, if the person was in a different location from t=0 and only began moving to their new location after the car arrived.

Yet another method is to select a most-recently-seen background. This will work, with the previous example, but if the car drives away while the person is still there, then the returned background will still not be correct, as the returned background will show the car, whereas the desired background is the original.

Thus, a need exists for an improved method of identifying unseen background in a frame of a video.

When foreground elements cease to move, the distinction between them and the background becomes difficult to define. A particular difficulty is the differing requirements on this distinction for different applications, and achieving a sensible semantic segmentation. As mentioned above, estimation of a background image with the foreground removed is valuable to assist with matting, frame matching, or as a visual aid, and the same uses exist for the removal of some background elements. Furthermore, semantic grouping of different regions enables applications which trace the history of a region of the scene. In another application, the grouping of foreground and background regions by the arrival time of objects allows per-object statistics and transitions between foreground and background depending on the application.

One method to separate foreground from background, adapts the background continuously to the current frame content. A changed region will become part of the background when the adaptation of the background becomes sufficiently similar to the region. A particular difficulty with this approach is that different regions, and different parts of the region, will merge with the background at different times depending on their appearance.

Another method establishes an age threshold for each visual element, allowing a foreground region to merge with the background over time. A particular difficulty is a choice of threshold. Another particular difficulty is partial absorption of the region into the background, leading to partial, fragmented, or moving regions reported to later processing stages.

Yet another method groups all foreground visual elements at a given frame, and makes a decision on merging them into the background based on the averaged statistics of the entire region. A particular difficulty with such methods is that the region may actually be composed of multiple sub-regions, which would result in inaccurate averaged statistics.

Thus a need exists for an improved method of grouping related visible visual elements with known but currently unseen ones.

SUMMARY

According to one aspect of the present disclosure, there is provided a computer-implemented method of associating a first mode model in a first visual element model, with a second mode model selected from a plurality of mode models in second visual element model. The mode models are in a scene model used for object detection in an image sequence. The method identifies a strength of a relationship between the first mode model and the second mode model, and associates the first mode model and the second mode model based on said relationship.

Desirably the associating step associates the first mode model and the second mode model in an event that: (a) the strength of the relationship between the first mode model and the second mode model meets a first pre-determined criterion of a first set of strengths of relationships between the first mode model and said plurality of mode models in the second visual element model; and (b) the strength of the relationship between said first mode model and said second mode model meets a second pre-determined criterion of a second set of strengths of relationships between said second mode model and one or more mode models in the first visual element model.

Alternatively the associating step associates the first mode model and the second mode model in an event that the strength of the relationship is a maximum of a set of strengths of relationships between the first mode model and a plurality of mode models in the second visual element model, the first mode model being a scene mode model for the first visual element model, whereupon the method selects the associated second mode model as a scene mode model. Preferably the method further comprises reconstructing a scene of the image sequence based on the first scene mode model and the selected second mode model.

According to another aspect of the present disclosure, there is provided a computer-implemented method comprising updating a scene model used for object detection in an image sequence by modifying a relationship between a first mode model associated with a first visual element and a second mode model associated with a second visual element. The updating may comprise: determining a co-occurrence between the first mode model and the second mode model; modifying the relationship between the first mode model and the second mode model, dependent upon the determination of the co-occurrence between the first mode model and the second mode model; and updating the scene model based on the modified relationship between the first mode model and the second mode model.

According to another aspect of the present disclosure, there is provided a computer-implemented method of updating a scene model used for object detection in a video sequence by defining a relationship between a pair of mode models relating to different visual elements of the scene model. The method determines a temporal correlation between each of the mode models in the pair of mode models, dependent upon a predetermined criterion, and also determines a classification of each mode model in the pair of mode models. The method modifies the relationship between the pair of mode models, dependent upon the determination of the temporal correlation and the determination of the classification. Based upon the modified relationship, the method updates the scene model.

According to a further aspect of the present disclosure, there is provided a camera system for updating a scene model used for object detection in a video sequence by defining a relationship between a pair of mode models relating to different visual elements of the scene model. The camera system includes an optical system, a sensor, a storage device for storing a computer program, and a controller coupled to each of the optical system and the sensor to capture the video sequence. The controller includes a processor for executing the program. The program includes: computer program code for determining a temporal correlation between the pair of mode models, dependent upon a predetermined criterion; computer program code for determining a classification of each mode model in the pair of mode models; computer program code for modifying the relationship between the pair of mode models, dependent upon the determination of the temporal correlation and the determination of the classification; and computer program code for updating the scene model based upon the modified relationship.

According to a still further aspect of the present disclosure, there is provided a computer readable storage medium having recorded thereon a computer program for directing a processor to execute a method of updating a scene model used for object detection in a video sequence by defining a relationship between a pair of mode models relating to different visual elements of the scene model. The computer program includes code for performing the steps of: determining a temporal correlation between the pair of mode models, dependent upon a predetermined criterion; determining a classification of each mode model in the pair of mode models;

modifying the relationship between the pair of mode models, dependent upon the determination of the temporal correlation and the determination of the classification; and updating the scene model based upon the modified relationship.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects are also disclosed.

BRIEF DESCRIPTION OF THE DRAWINGS

Various embodiments will now be described with reference to the following drawings, in which:

FIG. 9b shows the subsequent strengthening of the relationships corresponding to the mode models matched in FIG. 9a;

DETAILED DESCRIPTION INCLUDING BEST MODE

Figure 1:
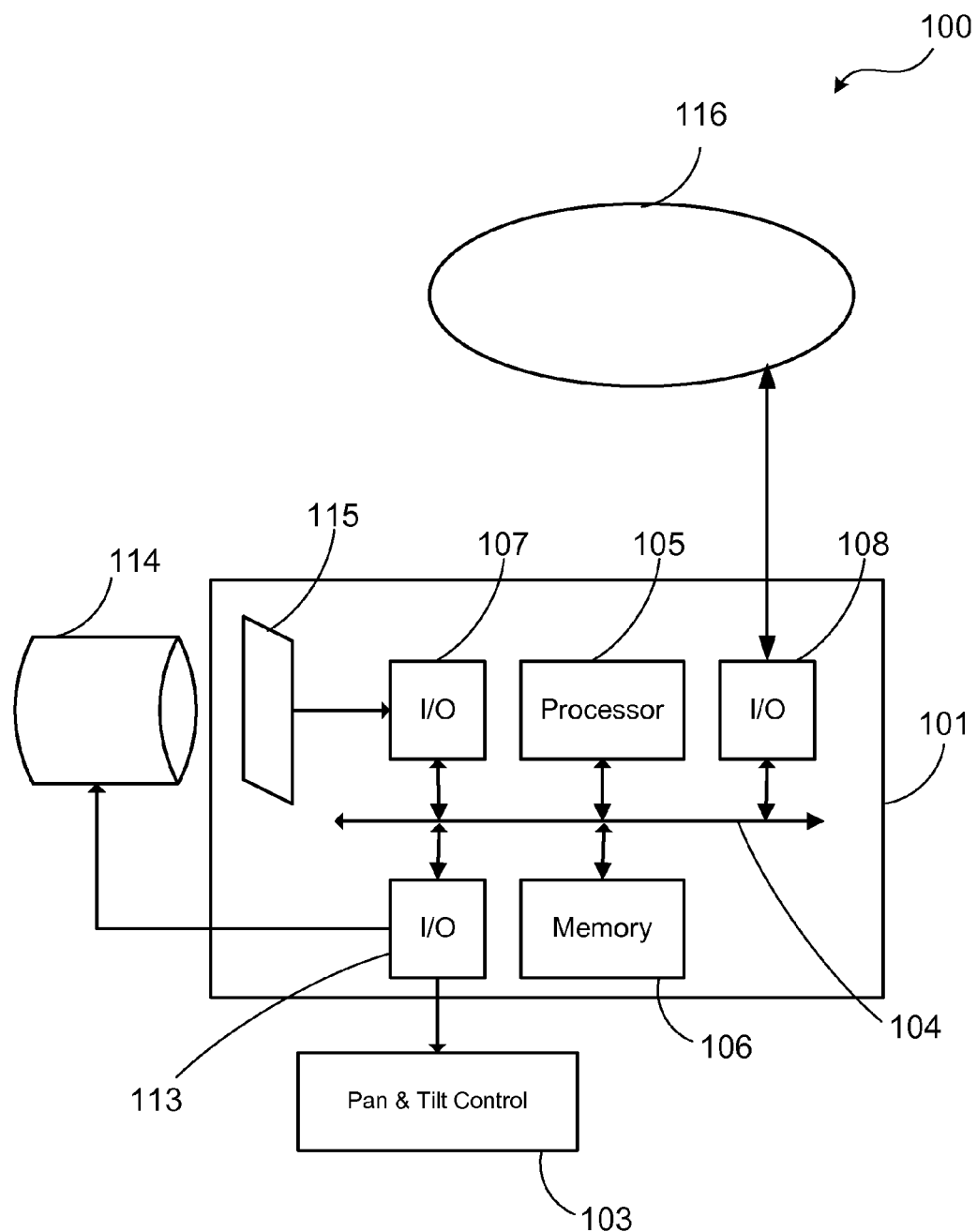
FIG. 1 is a functional block diagram of a camera, upon which foreground/background segmentation is performed.

Where reference is made in any one or more of the accompanying drawings to steps and/or features that have the same reference numerals, those steps and/or features have for the purposes of this description the same function(s) or operation(s), unless the contrary intention appears.

Disclosed herein are a computer-implemented method, system, and computer program product for creating and updating relationships between co-occurring mode models that relate to different visual elements in a scene. In one embodiment, the co-occurring mode models relate to neighbouring visual elements. In another embodiment, the co-occurring mode models relate to visual elements that are not neighbours. The method defines a relationship between a pair of mode models that relate to different visual elements and uses the relationship to update a scene model. The updated scene model is then available for use in processing of a video sequence.

The method uses a predetermined criterion to identify if the mode models of the pair have a temporal correlation with each other. The method then determines a classification of each mode model in the pair of mode models. In one embodiment, each of the mode models is classified as one of foreground or background. In an alternative embodiment, classification of each of the mode models is dependent upon the maturity of the respective mode model or an activity count associated with that mode model. It will be appreciated by a person skilled in the relevant art that other means of classification may equally be practised and the actual means of classification will depend on the particular application. The method modifies the relationship between the pair of mode models, based on the identification of the temporal correlation and the determination of the classification. The method then updates the scene model based on the modified relationship.

One aspect of the present disclosure provides a computer-implemented method for updating a scene model that is adapted for use in performing object detection when processing a video sequence. The method functions by defining a relationship between a pair of mode models that relates different visual elements of the scene model. The method determines whether the mode models in the pair of mode models share a temporal correlation with each other, dependent upon a predetermined criterion. In one implementation, the method processes a single image frame at a time, so the mode models available for processing are co-occurring and thus inherently share a temporal correlation with each other. The method then determines a classification of each mode model in the pair of mode models. The actual classification used depends on the particular application. Examples of classifications may include, for example, but are not limited to, foreground, background, age or maturity levels, activity counts, and recent activity measures. The method modifies the relationship between the pair of mode models, dependent upon the determination of the temporal correlation and the determination of the classification. The method then updates the scene model based upon the modified relationship.

Foreground/background segmentation in accordance with the present disclosure may be performed on a camera system. The camera system includes an optical system, a sensor or other recording device, a storage device for storing a computer program, and a controller coupled to each of the optical system and the sensor to capture a video sequence of one or more video frames. In one embodiment, the optical system includes a lens system. In one embodiment, the sensor is a photo-sensitive sensor array. In one embodiment, the storage device is memory, such as Random Access Memory (RAM) or a hard disk drive.

FIG. 1 shows a functional block diagram of a camera 100, upon which foreground/background segmentation is performed. The camera 100 is a pan-tilt-zoom camera (PTZ) comprising a camera module 101, a pan and tilt module 103, and a lens system 114. The camera module 101 typically includes at least one processor unit 105 operating as a controller of the camera 100, and a memory unit 106, a photo-sensitive sensor array 115, an input/output (I/O) interface 107 that couples to the sensor array 115, an input/output (I/O) interface 108 that couples to a communications network 116, and an input/output (I/O) interface 113 for the pan and tilt module 103 and the lens system 114. The components 107, 105, 108, 113 and 106 of the camera module 101 typically communicate via an interconnected bus 104 and in a manner which results in a conventional mode of operation known to those in the relevant art.

The camera 100 is used to capture video frames, also known as input images, representing the visual content of a scene appearing in the field of view of the camera 100. Each frame captured by the camera 100 comprises more than one visual element. A visual element is defined as an image sample. In one embodiment, the visual element is a pixel, such as a Red-Green-Blue (RGB) pixel. In another embodiment, each visual element comprises a group of pixels. In yet another embodiment, the visual element is an 8 by 8 block of transform coefficients, such as Discrete Cosine Transform (DCT) coefficients as acquired by decoding a motion-JPEG frame, or Discrete Wavelet Transformation (DWT) coefficients as used in the JPEG-2000 standard. The colour model is YUV, where the Y component represents the luminance, and the U and V represent the chrominance.

Figure 3A:
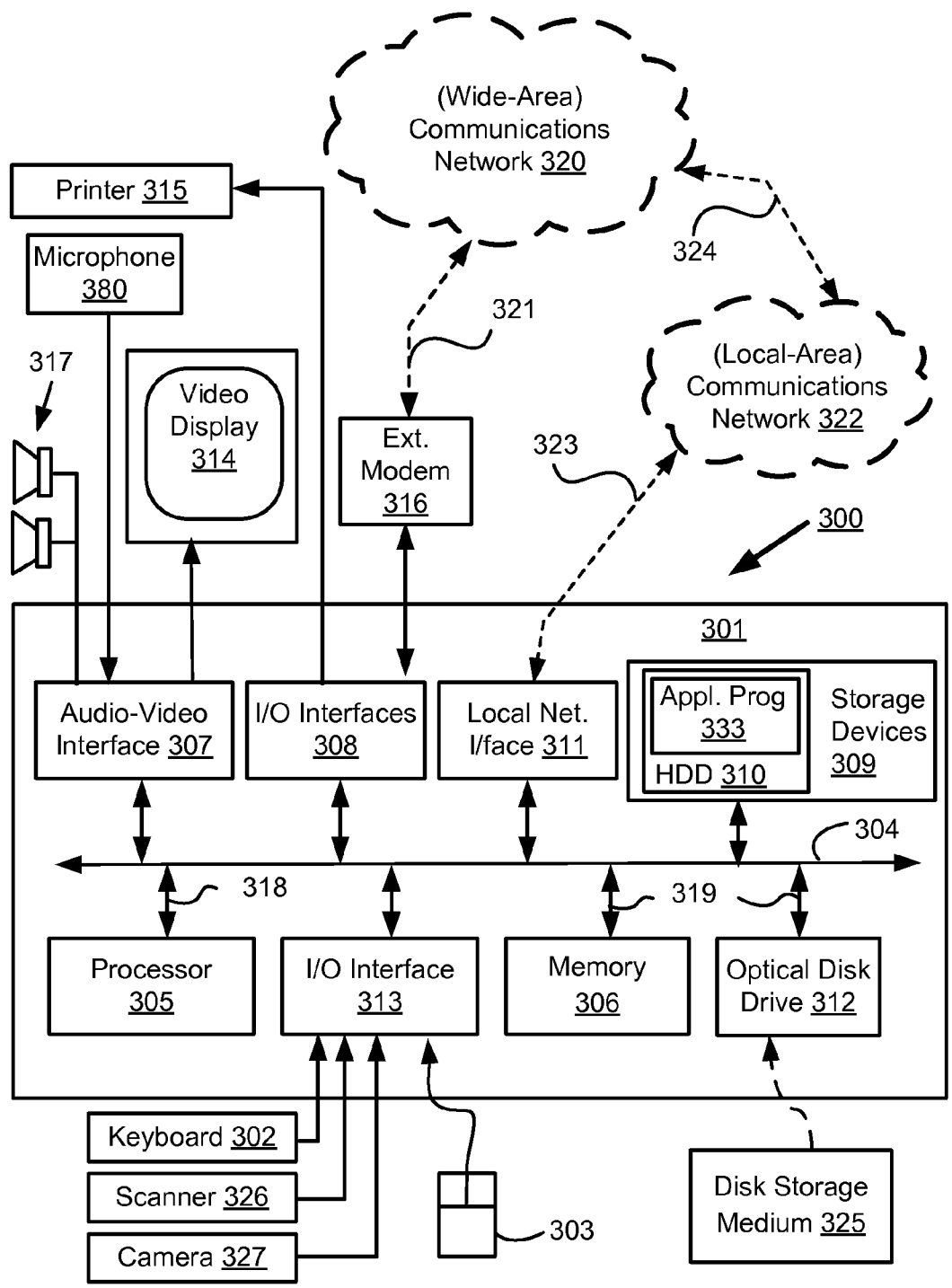
FIGS. 3A and 3B form a schematic block diagram of a general purpose computer system upon which arrangements described can be practiced.
Figure 3B:
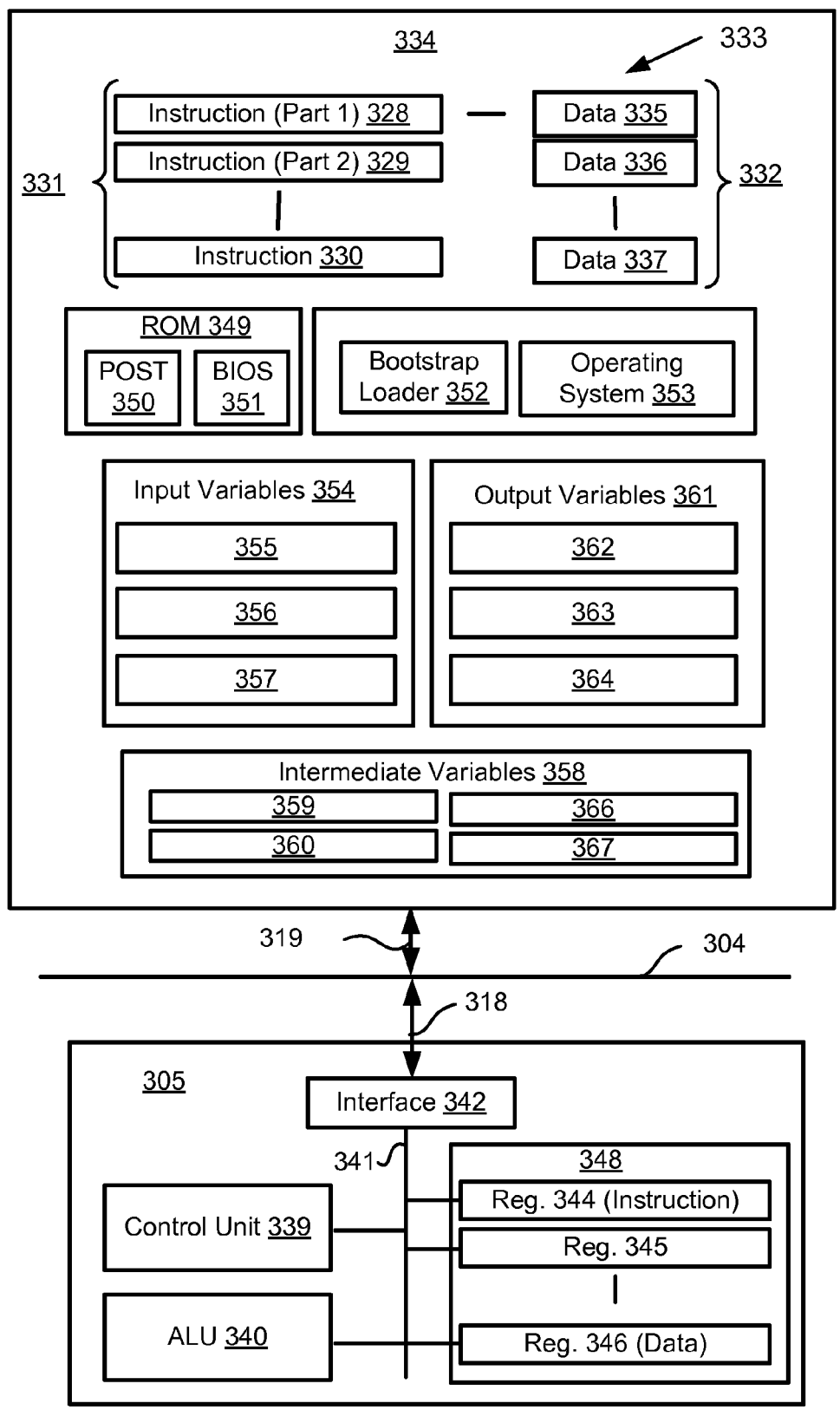

As indicated above, various embodiments according to the present disclosure may equally be practised on a device with an embedded processor, such as the camera of FIG. 1, or on a general purpose computer. FIGS. 3A and 3B depict a general-purpose computer system 300, upon which the various arrangements described can be practised.

As seen in FIG. 3A, the computer system 300 includes: a computer module 301; input devices such as a keyboard 302, a mouse pointer device 303, a scanner 326, a camera 327, and a microphone 380; and output devices including a printer 315, a display device 314 and loudspeakers 317. An external Modulator-Demodulator (Modem) transceiver device 316 may be used by the computer module 301 for communicating to and from a communications network 320 via a connection 321. The communications network 320 may be a wide-area network (WAN), such as the Internet, a cellular telecommunications network, or a private WAN. Where the connection 321 is a telephone line, the modem 316 may be a traditional "dial-up" modem. Alternatively, where the connection 321 is a high capacity (e.g., cable) connection, the modem 316 may be a broadband modem. A wireless modem may also be used for wireless connection to the communications network 320.

The computer module 301 typically includes at least one processor unit 305, and a memory unit 306. For example, the memory unit 306 may have semiconductor random access memory (RAM) and semiconductor read only memory (ROM). The computer module 301 also includes an number of input/output (I/O) interfaces including: an audio-video interface 307 that couples to the video display 314, loudspeakers 317 and microphone 380; an I/O interface 313 that couples to the keyboard 302, mouse 303, scanner 326, camera 327 and optionally a joystick or other human interface device (not illustrated); and an interface 308 for the external modem 316 and printer 315. In some implementations, the modem 316 may be incorporated within the computer module 301, for example within the interface 308. The computer module 301 also has a local network interface 311, which permits coupling of the computer system 300 via a connection 323 to a local-area communications network 322, known as a Local Area Network (LAN). As illustrated in FIG. 3A, the local communications network 322 may also couple to the wide network 320 via a connection 324, which would typically include a so-called "firewall" device or device of similar functionality. The local network interface 311 may comprise an Ethernet™ circuit card, a Bluetooth™ wireless arrangement or an IEEE 802.11 wireless arrangement; however, numerous other types of interfaces may be practised for the interface 311.

The I/O interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 300.

The components 305 to 313 of the computer module 301 typically communicate via an interconnected bus 304 and in a manner that results in a conventional mode of operation of the computer system 300 known to those in the relevant art. For example, the processor 305 is coupled to the system bus 304 using a connection 318. Likewise, the memory 306 and optical disk drive 312 are coupled to the system bus 304 by connections 319. Examples of computers on which the described arrangements can be practised include IBM-PCs and compatibles, Sun Sparcstations, Apple Mac™ or like computer systems.

The method of updating a scene model used for object detection by defining a relationship between a pair of mode models relating to different visual elements may be implemented using the computer system 300 wherein the processes of FIGS. 2 and 4 to 18, to be described, may be implemented as one or more software application programs 333 executable within the computer system 300. In particular, the steps of the method of updating a scene model are effected by instructions 331 (see FIG. 3B) in the software 333 that are carried out within the computer system 300. The software instructions 331 may be formed as one or more code modules, each for performing one or more particular tasks. The software may also be divided into two separate parts, in which a first part and the corresponding code modules perform the updating, correlating, classifying, and relationship modifying methods and a second part and the corresponding code modules manage a user interface between the first part and the user.

The software 333 is typically stored in the HDD 310 or the memory 306. The software is loaded into the computer system 300 from a computer readable medium, and executed by the computer system 300. Thus, for example, the software 333 may be stored on an optically readable disk storage medium (e.g., CD-ROM) 325 that is read by the optical disk drive 312. A computer readable medium having such software or computer program recorded on it is a computer program product. The use of the computer program product in the computer system 300 preferably effects an apparatus for updating a scene model for use in detecting objects in a video sequence. Such an apparatus may be used, for example, in surveillance applications.

In some instances, the application programs 333 may be supplied to the user encoded on one or more CD-ROMs 325 and read via the corresponding drive 312, or alternatively may be read by the user from the networks 320 or 322. Still further, the software can also be loaded into the computer system 300 from other computer readable media. Computer readable storage media refers to any non-transitory tangible storage medium that provides recorded instructions and/or data to the computer system 300 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 301. Examples of transitory or non-tangible computer readable transmission media that may also participate in the provision of software, application programs, instructions and/or data to the computer module 301 include radio or infra-red transmission channels as well as a network connection to another computer or networked device, and the Internet or Intranets including e-mail transmissions and information recorded on Websites and the like.

The second part of the application programs 333 and the corresponding code modules mentioned above may be executed to implement one or more graphical user interfaces (GUIs) to be rendered or otherwise represented upon the display 314. Through manipulation of typically the keyboard 302 and the mouse 303, a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

FIG. 3B is a detailed schematic block diagram of the processor 305 and a "memory" 334. The memory 334 represents a logical aggregation of all the memory modules (including the HDD 309 and semiconductor memory 306) that can be accessed by the computer module 301 in FIG. 3A.

When the computer module 301 is initially powered up, a power-on self-test (POST) program 350 executes. The POST program 350 is typically stored in a ROM 349 of the semiconductor memory 306 of FIG. 3A. A hardware device such as the ROM 349 storing software is sometimes referred to as firmware. The POST program 350 examines hardware within the computer module 301 to ensure proper functioning and typically checks the processor 305, the memory 334 (309, 306), and a basic input-output systems software (BIOS) module 351, also typically stored in the ROM 349, for correct operation. Once the POST program 350 has run successfully, the BIOS 351 activates the hard disk drive 310 of FIG. 3A. Activation of the hard disk drive 310 causes a bootstrap loader program 352 that is resident on the hard disk drive 310 to execute via the processor 305. This loads an operating system 353 into the RAM memory 306, upon which the operating system 353 commences operation. The operating system 353 is a system level application, executable by the processor 305, to fulfil various high level functions, including processor management, memory management, device management, storage management, software application interface, and generic user interface.

The operating system 353 manages the memory 334 (309, 306) to ensure that each process or application running on the computer module 301 has sufficient memory in which to execute without colliding with memory allocated to another process. Furthermore, the different types of memory available in the system 300 of FIG. 3A must be used properly so that each process can run effectively. Accordingly, the aggregated memory 334 is not intended to illustrate how particular segments of memory are allocated (unless otherwise stated), but rather to provide a general view of the memory accessible by the computer system 300 and how such is used.

As shown in FIG. 3B, the processor 305 includes a number of functional modules including a control unit 339, an arithmetic logic unit (ALU) 340, and a local or internal memory 348, sometimes called a cache memory. The cache memory 348 typically include a number of storage registers 344-346 in a register section. One or more internal busses 341 functionally interconnect these functional modules. The processor 305 typically also has one or more interfaces 342 for communicating with external devices via the system bus 304, using a connection 318. The memory 334 is coupled to the bus 304 using a connection 319.

The application program 333 includes a sequence of instructions 331 that may include conditional branch and loop instructions. The program 333 may also include data 332 which is used in execution of the program 333. The instructions 331 and the data 332 are stored in memory locations 328, 329, 330 and 335, 336, 337, respectively. Depending upon the relative size of the instructions 331 and the memory locations 328-330, a particular instruction may be stored in a single memory location as depicted by the instruction shown in the memory location 330. Alternatively, an instruction may be segmented into a number of parts each of which is stored in a separate memory location, as depicted by the instruction segments shown in the memory locations 328 and 329.

In general, the processor 305 is given a set of instructions which are executed therein. The processor 1105 waits for a subsequent input, to which the processor 305 reacts to by executing another set of instructions. Each input may be provided from one or more of a number of sources, including data generated by one or more of the input devices 302, 303, data received from an external source across one of the networks 320, 302, data retrieved from one of the storage devices 306, 309 or data retrieved from a storage medium 325 inserted into the corresponding reader 312, all depicted in FIG. 3A. The execution of a set of the instructions may in some cases result in output of data. Execution may also involve storing data or variables to the memory 334.

The disclosed updating, correlating, modifying, and determining arrangements use input variables 354, which are stored in the memory 334 in corresponding memory locations 355, 356, 357. The updating, correlating, modifying, and determining arrangements produce output variables 361, which are stored in the memory 334 in corresponding memory locations 362, 363, 364. Intermediate variables 358 may be stored in memory locations 359, 360, 366 and 367.

Referring to the processor 305 of FIG. 3B, the registers 344, 345, 346, the arithmetic logic unit (ALU) 340, and the control unit 339 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328, 329, 330;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Each step or sub-process in the processes of FIGS. 4 to 13 is associated with one or more segments of the program 333 resident on the HDD 310 or memory 306 on a computer module 301 or the memory 106 on board the camera module 101. The program 333 is performed by the register section 344, 345, 347, the ALU 340, and the control unit 339 in the processor 305 on the computer module 301 or processor 105 on board the camera module 105 to perform the fetch, decode, and execute cycles for every instruction in the instruction set for the noted segments of the program 333.

The method of updating a scene model may alternatively be implemented in dedicated hardware such as one or more integrated circuits performing the functions or sub functions of updating, correlating, determining, and relationship modifying. Such dedicated hardware may include graphic processors, digital signal processors, or one or more microprocessors and associated memories.

Figure 2:
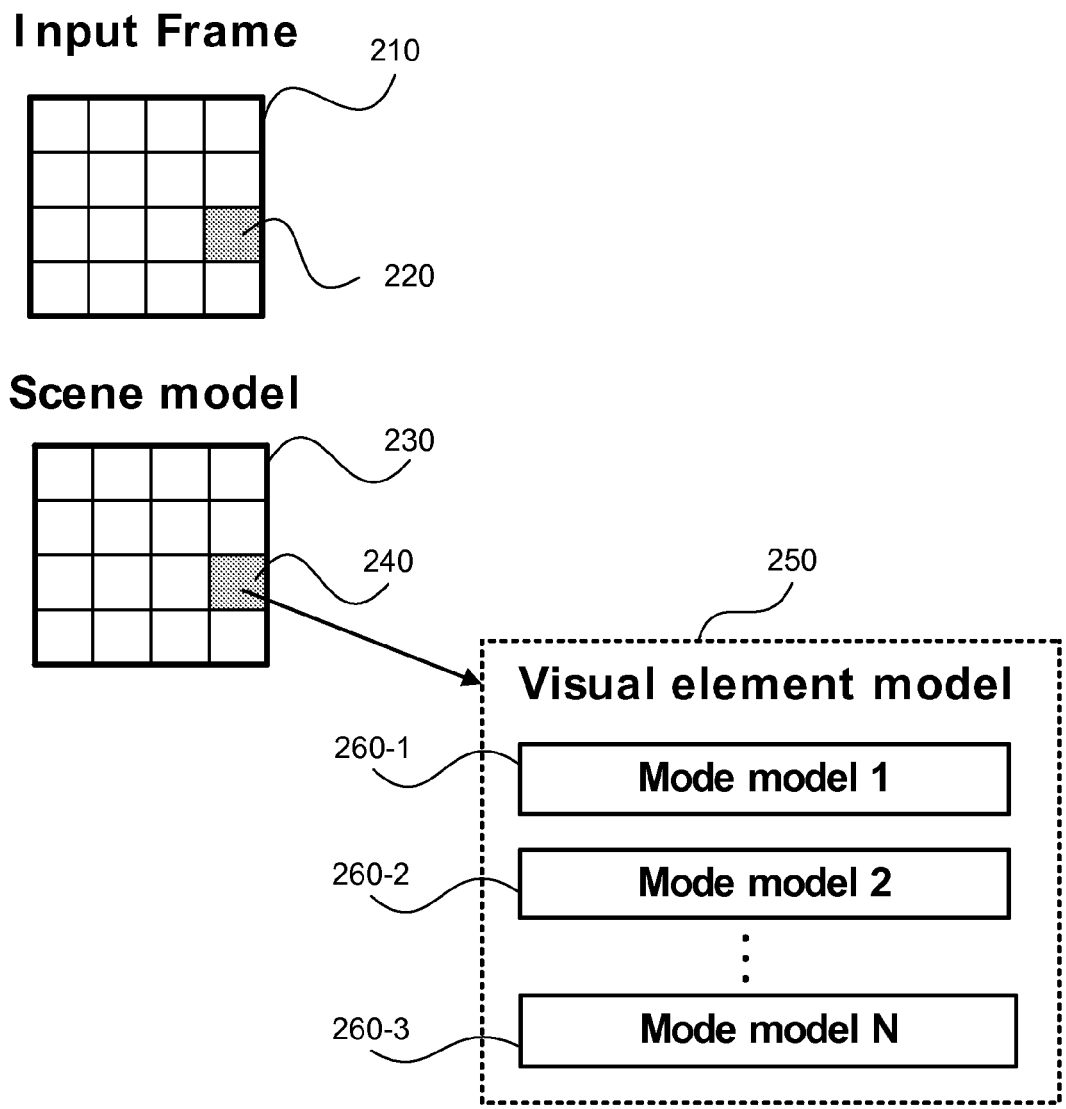
FIG. 2 is a block diagram of an input frame and a scene model that includes visual element models, each with mode models.

FIG. 2 shows a schematic representation of an input frame 210 that includes a plurality of visual elements. A visual element is the elementary unit at which processing takes place and is captured by an image sensor such as a camera 100. A visual element may be, for example, a pixel or an 8×8 DCT block. FIG. 2 also shows a schematic representation of a scene model 230 that includes a plurality of visual element models. In the example shown, the input frame 210 includes an exemplary visual element 220 and the scene model 230 includes a corresponding exemplary visual element 240. In one arrangement, the scene model 230 is stored in the memory 106 of the camera 100. In one arrangement, the processing takes place on the processor 105 of the camera 100. In an alternative arrangement, processing of an input frame is performed by instructions executing on a processor of a general purpose computer, such as the computer module 301.

A scene model includes a plurality of visual element models. For each input visual element 220 that is modelled, such as the visual element 240, a corresponding visual element model 240, whose contents are expanded 250, is maintained. Each visual element model 250 includes a set of one or more mode models 260. There can be several mode models corresponding to the same location in the captured input frame 210. Each of the mode models 260-1, 260-2, 260-3 are based on a set of the history of values for the corresponding visual element, in this case the visual element 240. The visual element model 250 includes a set of mode models that includes mode model 1, 260-1, mode model 2, 260-2, up to mode model N, 260-3.

Each mode model 260 corresponds to a different state or appearance of a corresponding visual element. For example, where a flashing neon light is in the scene being modelled, and mode model 1, 260-1, represents "background—light on", mode model 2, 260-2, may represent "background—light off", and mode model N, 260-3, may represent a temporary foreground element such as part of a passing car. In one arrangement, the mode model is the mean value of pixel intensity values. In another arrangement, the mode model is the median or the approximated median of observed DCT coefficient values for each DCT coefficient, and the mode model records temporal characteristics.

Figure 9A:
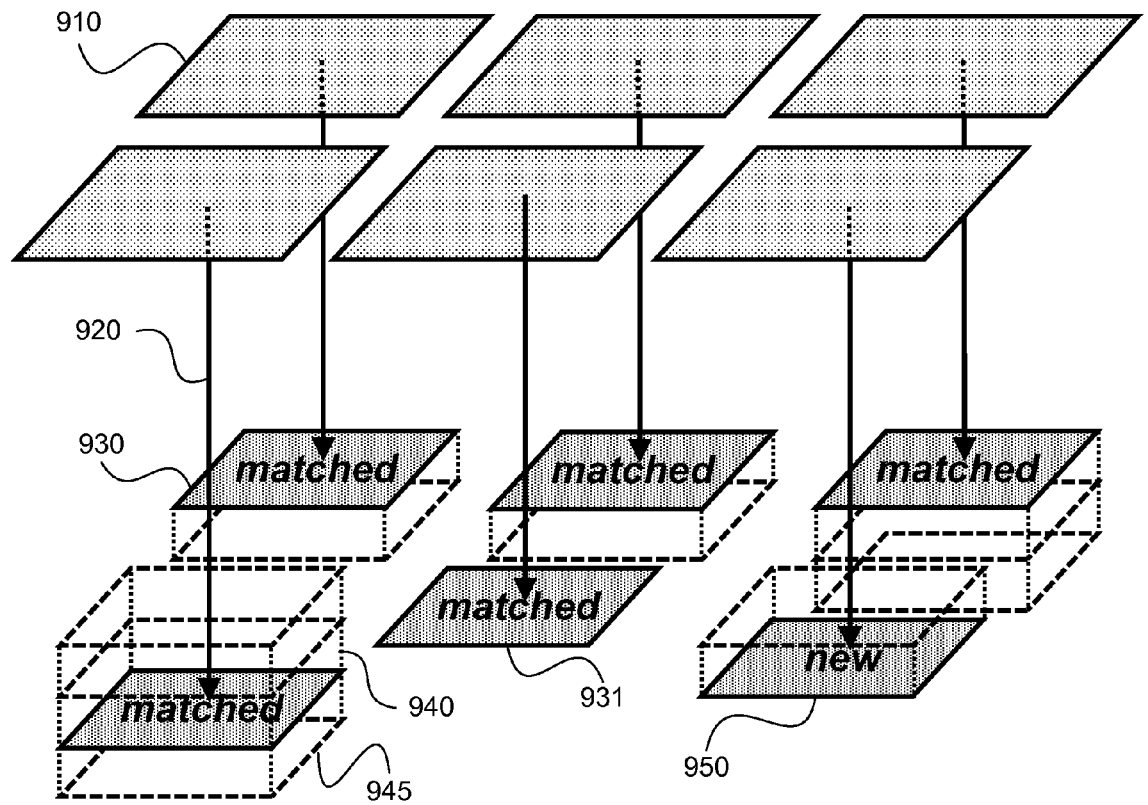
FIG. 9a is a schematic representation showing the matching of an input frame to the mode models in visual element models.

FIG. 9a shows a schematic representation of the matching 920 of an example six visual elements 910 (as per 220), of an input frame (as per 210) to different mode models 930 (as per 260) in six visual element models 940 (as per 250) corresponding to those elements. In one of the examples, instead of a match 920, a new mode model 950 is created. The frame is associated with a time at which the frame was captured, so the matched mode models in turn are associated with a particular time.

In one embodiment, there is exactly one matched mode model in each visual element model. In another embodiment, multiple mode models can be matched at the same time by the same visual element. In one embodiment, at least one mode model must match a visual element model. In another embodiment, it is possible for no mode model to be matched at all in a visual element model.

In one embodiment, a visual element can only be matched to the mode models in a corresponding visual element model. In another embodiment, a visual element can be matched to a mode model in a neighbouring visual element model. In yet another embodiment, there are visual element models representing a plurality of visual elements and a mode model in that visual element mode model can be matched to any one of the plurality of visual elements, or to a plurality of those visual elements.

Figure 9B:
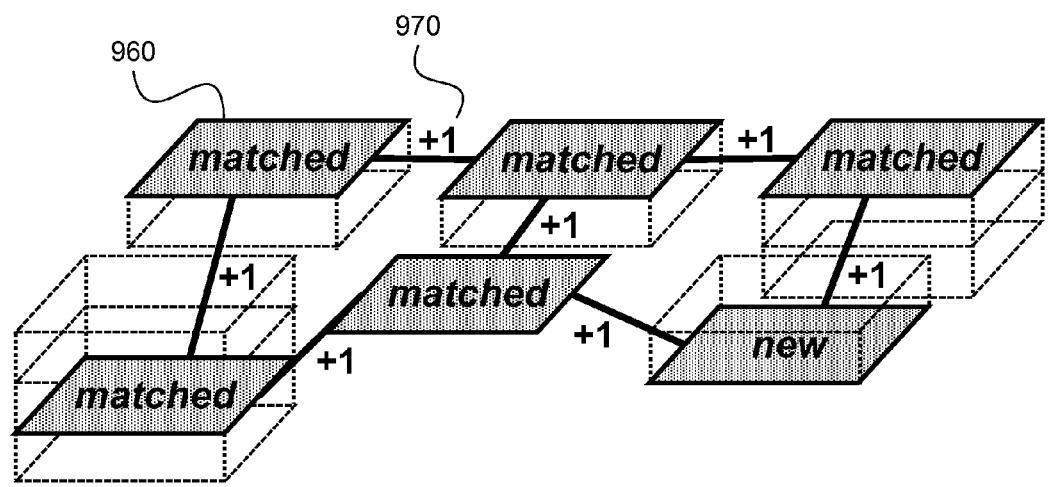

FIG. 9b shows a schematic representation of the same matched mode models 960 as in FIG. 9a, 930, at a later point in processing. In FIG. 9b, a co-occurrence count 970 forming part of the relationship, has been increased between neighbouring mode models to indicate that they were matched at the same time.

In one embodiment, the relationship is comprised only of the matching count. In another embodiment, the relationship includes other information, for example a timestamp or frame number of the last co-occurrence. In one embodiment, frame numbers or frame times corresponding to each co-occurrence are recorded.

In one embodiment, co-occurrence relationships are only recorded for neighbouring mode models. In another embodiment, co-occurrence relationships are recorded between mode models within a given distance of each other. In yet another embodiment, co-occurrence relationships are recorded based on the content of the input frames and their visual elements.

Figure 4:
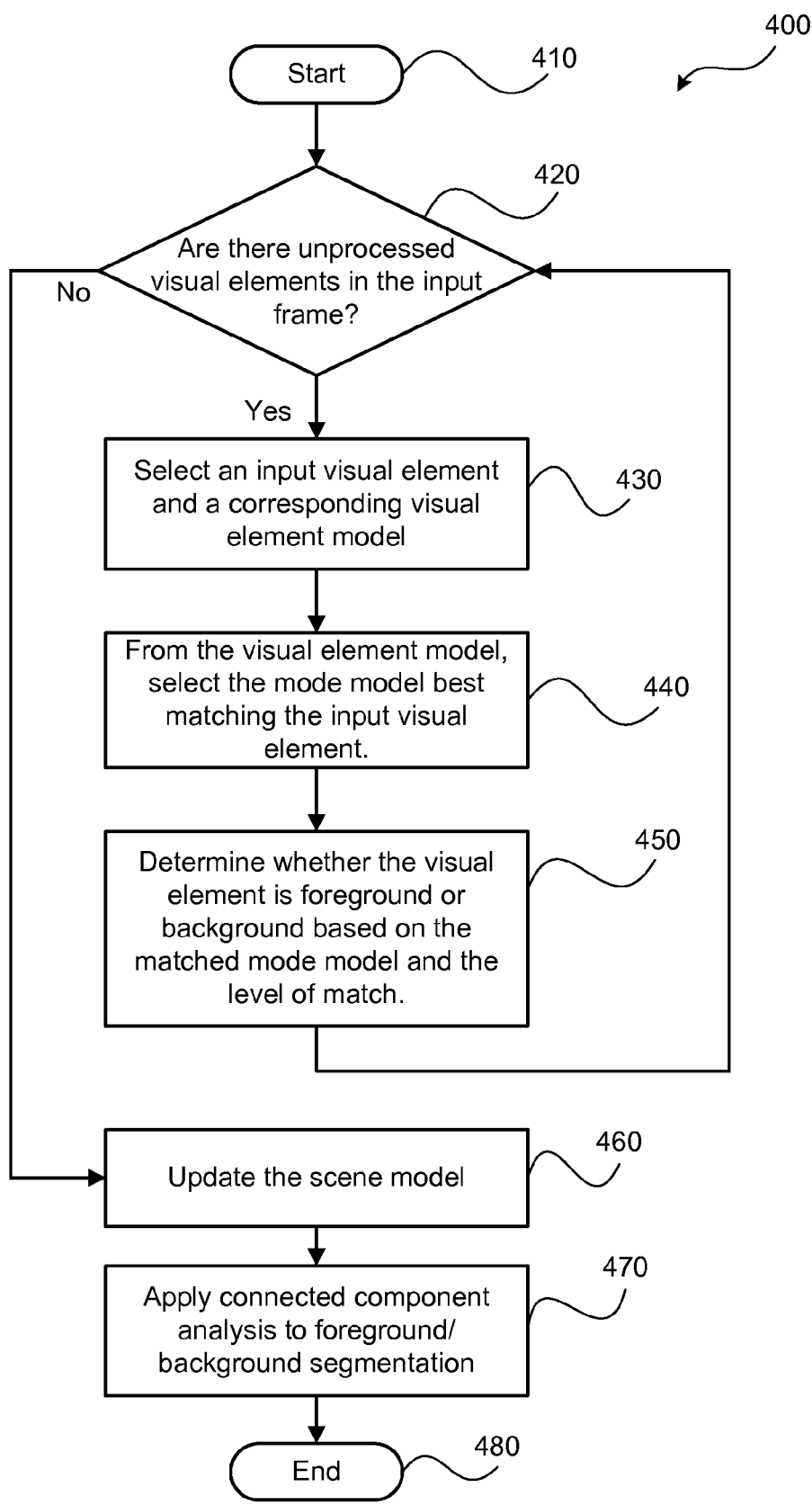
FIG. 4 is a schematic flow diagram illustrating functionality of a foreground/background separation data processing architecture.

FIG. 4 is a flow diagram illustrating a process 400 for an overall approach to background/foreground segmentation. The process 400 is typically implemented in software stored in the memory 106/310 and executed by the processor 105/305 as previously described. The segmentation process 400 begins at a Start step 410, where the processor receives an input frame. Control passes to a decision step 420 where the processor determines whether any visual elements 220 of the input frame, such as pixels or blocks, are yet to be processed 420. If there are more visual elements 220 to be processed, Yes, then control passes from step 420 to step 430, where the processor selects a visual element 220 for further processing and identifies a corresponding visual element model. Control passes to selecting step 440, in which the processor compares the visual element 220 from the input frame 210 against the mode models in the visual element model corresponding to the visual element that is being processed, in order to select a closest-matching mode model, to be known as the matched mode model. Control passes to classifying step 450, where the processor determines whether the visual element that is being processed represents foreground or background, based on the properties of the mode model and further based on a match between the visual element and the mode model. Next, control passes from classifying step 450 and returns to decision step 420 for the processor to determine whether there are any more visual elements to be processed.

If at decision step 420 there are no more visual elements in the input frame to be processed, No, then the segmentation process is complete at the visual element level and control passes from step 420 to updating step 460. After processing all the visual elements, step 460 then updates the scene model according to the determined matched mode model for each visual element. The updating may include storing the updates scene model in the memory. Control passes from step 460 to post-processing step 470, where the processor performs post-processing steps, which may include, for example, applying connected component analysis on the segmentation results using standard techniques, such as flood fill. Other post-processing steps may include, for example, removing small connected components, or morphological filtering of the segmentation result. After step 470, control passes to an End step 480 and the process 400 ends with respect to the input frame. The process may optionally be repeated for other frames in the sequence.

As described above, in step 440 the processor selects a closest-matching mode. There are multiple ways to select a matching mode models. One arrangement compares an input visual element 220 to each of the mode models in the visual element model corresponding to that input visual element. The arrangement then selects the mode model with the highest similarity as a matching mode model. Another arrangement utilises a threshold value to determine if a match between an input visual element and a mode model is an acceptable match, and there is no need to compare further mode models once a match satisfies the threshold. For example, a mode model match is determined if the input value is within 2.5 standard deviations of the mean of the mode model. The latter arrangement is useful in an implementation in which computing a similarity is an expensive operation. An alternative arrangement utilises more than one match criterion to obtain more than one type of match, and then utilises the match type to determine a later process or mode model for a process to act upon. For example, separate matches are made for an intensity pattern match, and for an overall brightness match.

One aspect of the present disclosure is computing the similarity between the input visual element and a mode model. For simple background models, such as a mean intensity representation, the computation of similarity is straightforward. For more complex background models, determining similarity is not trivial. For example, when the visual element is an 8×8 block with DCT coefficients, similarity needs to be defined over multiple variables. One arrangement utilises machine learning techniques to map multi-dimensional input values to one probability value, indicating the probability that a mode model matches the input visual element. Such machine learning techniques may include, for example, Support Vector Machines and Naïve Bayes classifiers.

The selection of a matching mode model based purely on the information in the visual element is sensitive to noise in the input signal. This can be reduced by taking into account the context, such as by considering spatially neighbouring visual elements. The goal of object detection is to find objects that are sufficiently visible to span multiple visual elements. Therefore, when one visual element is found to be foreground, it is reasonable to expect that there are other foreground visual elements in the neighbourhood of that visual element. If there are no foreground visual elements in the neighbourhood of that visual element, it is possible that the visual element should not be determined to be foreground.

Visual elements that are part of the same object are not necessarily visually similar. However, visual elements that are part of the same object are likely to have similar temporal characteristics. For example, if the object is moving, all visual elements associated with that object will have been visible only for a short period. In contrast, if the object is stationary, all visual elements will have been modelled for a similar, longer period of time.

Figure 5:
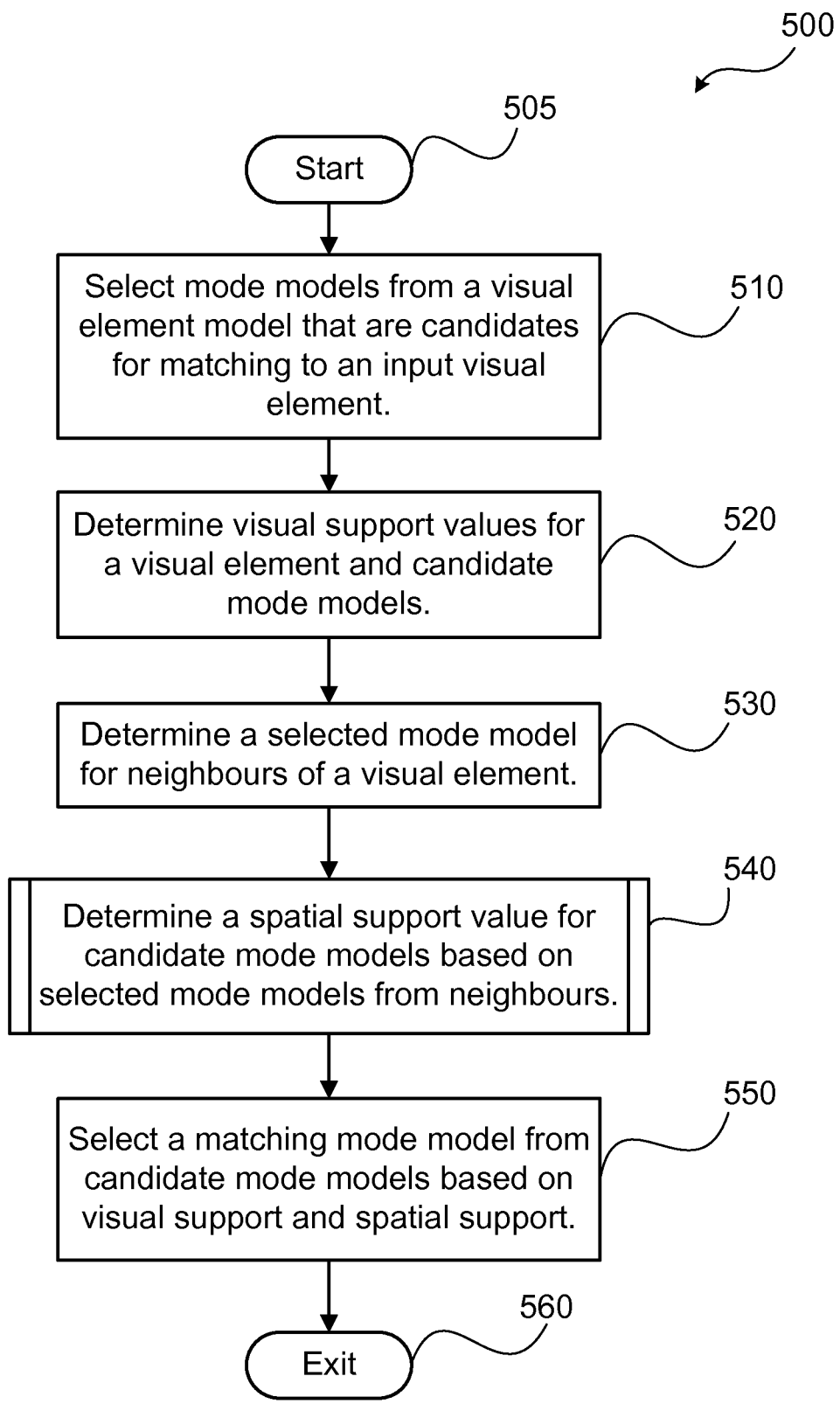
FIG. 5 is a schematic flow diagram illustrating a method of mode model matching.

FIG. 5 is a flow diagram of a process 500 for selecting a matching mode, based on temporal characteristics. The process 500 is typically implemented in software executable by the processor and acts on each visual element and begins at a Start step 505. Control passes to step 510, where the processor selects candidate mode models from a visual element model corresponding to the visual element being processed, for matching to the input visual element that is being processed. Next, control passes to step 520 where the processor determines visual support values for the visual element and candidate mode models. The support value indicates what contribution the visual similarity makes to determining a mode model match.

In one embodiment, a probability of matching is used as visual support value. In another embodiment, a fixed point approximation of probability of matching is used as visual support value.

Control passes from step 520 to step 530, which applies the same matching mode model selection process from step 520 to find matching candidates for neighbours of the input visual element. After computing visual support for a candidate mode model, control passes to step 540 to compute spatial support. Spatial support is the support given from the matched candidates of the neighbours. Finally, control passes to step 550, where the processor selects a matching mode model from the candidate mode models. For each candidate mode model, the spatial support and the visual support are combined to compute a mode model matching score. In one embodiment, the mode model matching scores are combined by adding them after applying a weighting function:

$$\text{Mode\_model\_matching\_score} = w_v \cdot \text{Visual\_Support} + w_s \cdot \text{Spatial\_Support}.$$

Spatial_Support is the total spatial support given to the candidate mode. Weight $w_v$ indicates the importance of the visual support, say 0.5, and weight $w_s$ indicates the importance of the total spatial support, say 0.5. Note that the weight can be used to normalise the support values. In one example, $w_s$ is set to one (1).

In one arrangement, the mode model matching score is computed for each candidate mode model, and the candidate mode model with the highest mode model matching score is selected as the matching mode model corresponding to the input visual element 220. In another arrangement, a mode model matching threshold value, say four (4), is used. The mode model matching score is computed for candidate mode models until a mode model matching score exceeds the threshold. That is, the match is with a candidate mode model that is good enough, rather than necessarily the best mode model.

Control passes from step 550 to Exit step 560 and the processing of a visual element terminates. It will be appreciated that any number of other visual elements may be processed in a similar fashion.

Figure 6:
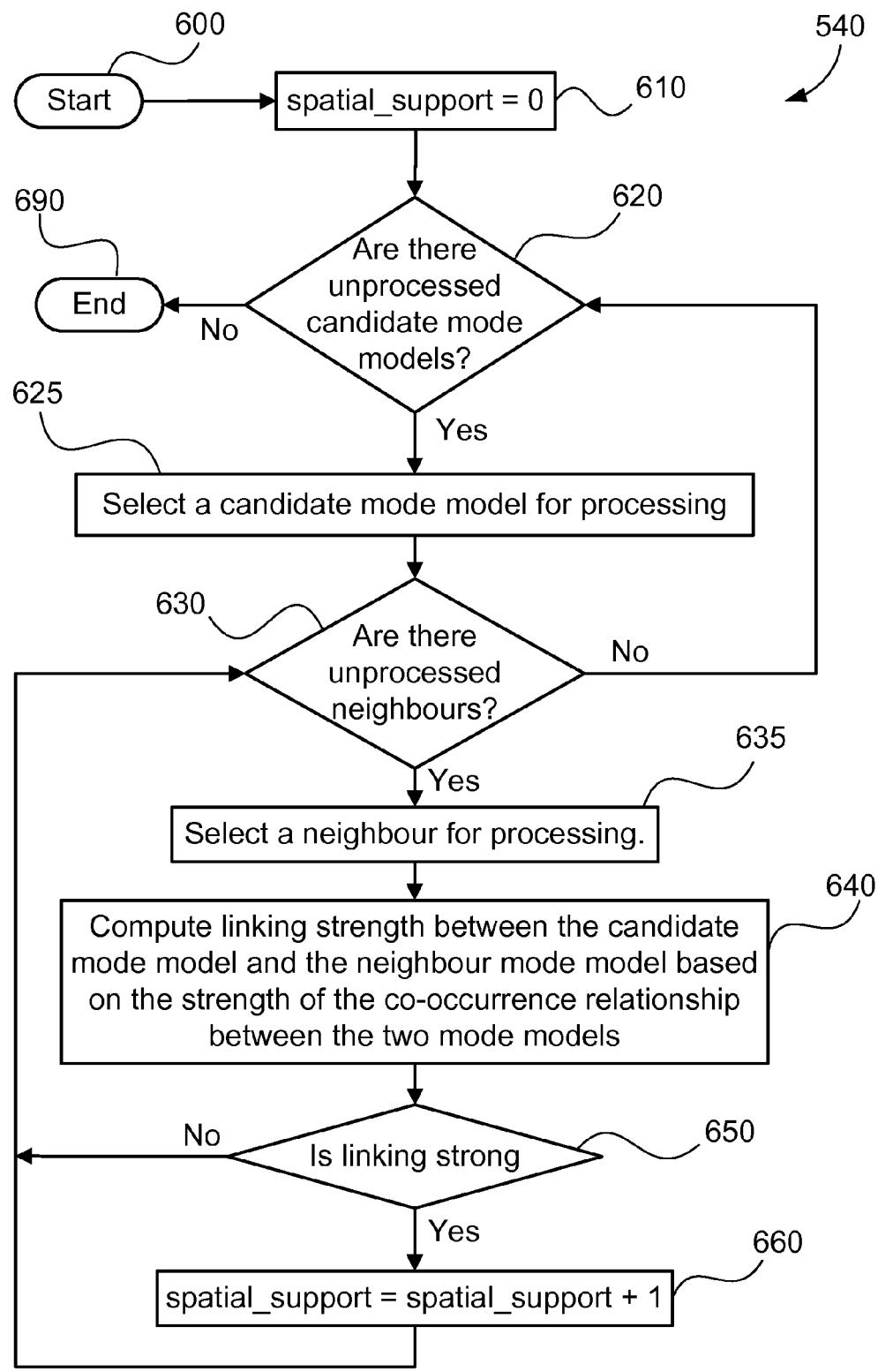
FIG. 6 is a schematic flow diagram illustrating a method of computing spatial support used in FIG. 5.

FIG. 6 is a flow diagram illustrating an embodiment of the process 540 of FIG. 5 for computing spatial support. The process 540 begins at a Start step 600 and proceeds to step 610, where the processor initialises a spatial_support value to zero (0). The process 540 compares candidate mode models to neighbouring mode models. Accordingly, it is necessary to check whether there are any more candidate mode models for which spatial support is to be computed. Control passes from step 610 to decision step 620, which determines whether there are any unprocessed candidate mode models. If there are no more unprocessed candidate mode models, No, control passes to an End step 690 and the process terminates by returning the spatial_support value. Otherwise, if at step 620 there is at least one unprocessed candidate mode model, Yes, control passes to step 625 to select an unprocessed candidate mode model for a comparison with neighbouring mode models of that unprocessed candidate mode model. Different implementations may utilise different criteria to determine neighbouring mode models. One arrangement considers the 4-connected neighbours of the visual element that is being processed. Another arrangement considers the 8-connected neighbours of the visual element that is being processed. A further arrangement considers the 21-connected neighbours of the visual element that is being processed.

Control passes from step 625 to decision step 630, where the processor determines whether there are any unprocessed neighbours for the visual element that is being processed. If there are no unprocessed neighbours, No, control returns to step 620 to process another candidate mode model. However, if at step 630 there is at least one remaining unprocessed neighbour for the visual element that is being processed, Yes, control passes from step 630 to step 635, which selects a neighbour for processing.

Control then passes to step 640, which computes a linking strength between the selected candidate mode model and the selected neighbour mode model, based on at least one relationship between the two mode models. Desirably the relationship is the strength of the co-occurrence between the two mode models. The linking strength is used to determine whether the linking is strong or not. Control passes from step 640 to decision step 650, which determines whether the linking strength between the selected candidate mode model and the selected neighbour mode model is strong. One embodiment of determining whether the linking is strong compares the linking strength with a predetermined threshold, say 0.5. If the linking strength is greater than or equal to the threshold, then the linking is deemed strong, otherwise, the linking is deemed weak. The linking strength provides for associating the mode models.

If step 650 determines that the linking strength is not strong, No, control returns from step 650 to decision step 630 to determine whether there are any other remaining neighbours to be processed. However, if step 650 determines that the linking strength is strong, Yes, control passes to step 660 where the processor increases the spatial_support value, in this case by incrementing.

If the linking strength is strong and if the two mode models share the same classification, such as both being foreground or both being background, then the neighbour has a selected mode model that is temporally similar to the candidate mode model, and the spatial support for that candidate mode model is increased, otherwise the spatial support remains unchanged.

The process of steps 620 to 660 is repeated for all candidate mode models and all mode models associated with neighbouring visual elements of the visual element to which the candidate mode models relate. For example, if there are 3 neighbours with a selected mode model that is temporally similar to a candidate mode model, and 1 neighbour with weak linking, then the spatial support is 3.

Figure 7:
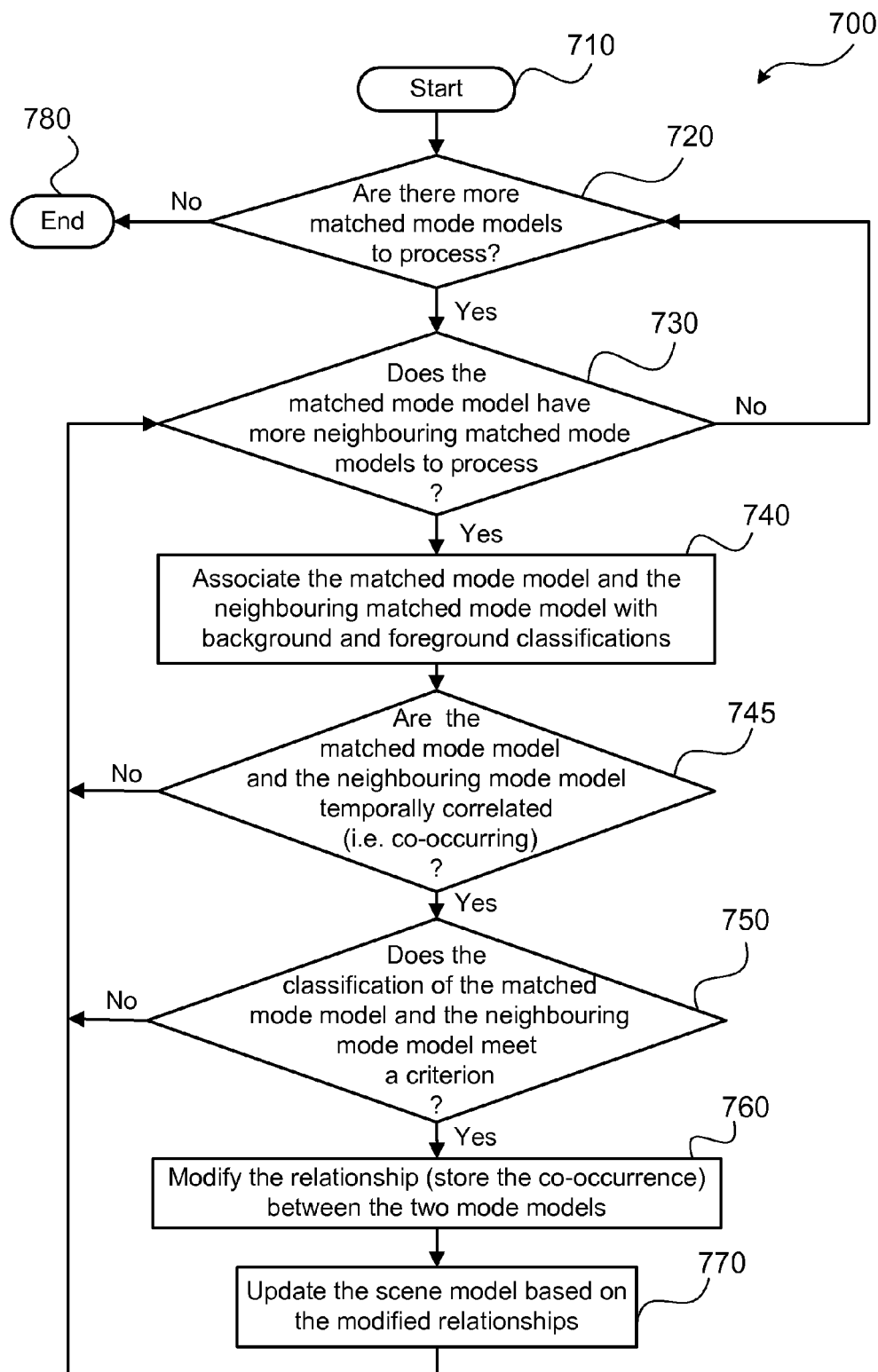
FIG. 7 is a schematic flow diagram illustrating a method of updating a scene model.

FIG. 7 is a flow diagram of a process 700 of updating a scene model. The process 700 is also preferably implemented in software executed by the processor 105/305, and begins at a Start step 710, where the processor receives a scene model, for example from memory 106/306, 310. Control passes to decision step 720, which determines whether any matched mode models are yet to be processed. If there are no more matched mode models remaining to be processed, No, then control passes from decision step 720 to an End step 780 and the process 700 terminates. However, if at step 720, there is at least one more matched mode model remaining to be processed, Yes, then control passes from decision step 720 to decision step 730 where the processor determines whether the matched mode model has any neighbouring mode models that have not yet been processed.

If there are no more matched mode model neighbours remaining to be processed, No, then the process involving this neighbour is complete and control returns from decision step 730 to step 720. However, if at step 730 there is at least one more neighbouring mode model remaining to be processed, Yes, then control passes from step 730 to step 740. The remaining processing is performed by the processor on the matched mode model and its matched neighbour mode model. The matched mode model and its matched neighbour mode model are referred to herein as the pair of mode models.

In step 740, the processor determines a classification of each mode model in the pair of mode models. The processor associates the matched mode model and its matched neighbour mode model with a classification. In this example, the classification is either foreground or background. In one embodiment, the determination of the classification is based on the age of the mode model. In another implementation, the age of a mode model is defined as the difference between the current frame number and the frame number in which the mode model is created. In another implementation, the age of a mode model is defined based on a time stamp. In alternative embodiments, other classifications may equally be utilised. In one alternative embodiment, each mode model is classified according to an associated age, which relates to the amount of time that has passed since that mode model was created. In another alternative embodiment, each mode model is classified according to how many times that mode model has been seen during processing of a video sequence, based, for example, on a hit count associated with that mode model. In a further alternative embodiment, each mode model is classified according to a measure of recent activity, based on how many times that mode model has been seen within a recent predetermined period of time.

Control passes from step 740 to step 745, where the processor determines whether there is a temporal correlation (i.e. a co-occurrence) between the matched mode model and the neighbouring mode model in the pair of mode models that is presently being processed. This is typically based on predetermined criteria, or a count thereof. In one embodiment, the processing occurs on a frame by frame basis. In such a context, the pair of mode models, which are both matched mode models, always have a temporal correlation, due to being matched in the same frame. In another embodiment, a correlation function based on the mode model history is used and the output is compared to a predetermined threshold that defines the correlation between the pair of mode models. If there is no temporal correlation between the pair of mode models, No, then the neighbouring mode model is marked as processed and control passes from step 745 to step 730 to process a next neighbouring mode model. If at step 745 there is a temporal correlation (co-occurrence) between the pair of mode models, Yes, control passes from step 745 to step 750.

The next step 750 determines whether the matched mode model and the neighbouring mode model have the same classification. If the matched mode model and the neighbouring mode model do not have the same classification, then the neighbour is marked as processed and control returns to decision step 730. If the pair of mode models have the same classification, Yes, then the matched mode model and the neighbouring mode model are deemed to be connected, and control passes from step 750 to step 760 where the processor modifies a relationship between the matched mode model and the neighbouring mode model in the pair of mode models.

In one embodiment of the modifying step 760, the relationship between the matched mode model and the neighbouring mode model is a count, and step 760 increases the count associated with that relationship by one (1). This count is referred to as co-occurrence, and is desirably stored in the memory 306 by the processor 305. In another embodiment, the relationship is a binary value and is marked as 'true', simply indicating co-occurrence without an attempt to ascribe a value to the co-occurrence. In another embodiment, the modification is dependent upon the determination of the temporal correlation and the determination of the classification.

Control passes from step 760 to an updating step 770, where the processor updates the scene model based on the modified relationships from step 760. After updating the relationship, the process returns from step 770 to decision step 730.

If there are no more matched mode models to be processed, then the process 700 of updating the relationships is complete.

The method described above with reference to FIG. 7 allows data-based co-activity modelling of the scene, which allows a better representation of the scene activity than methods that use only properties of the individual mode models.

Figure 8:
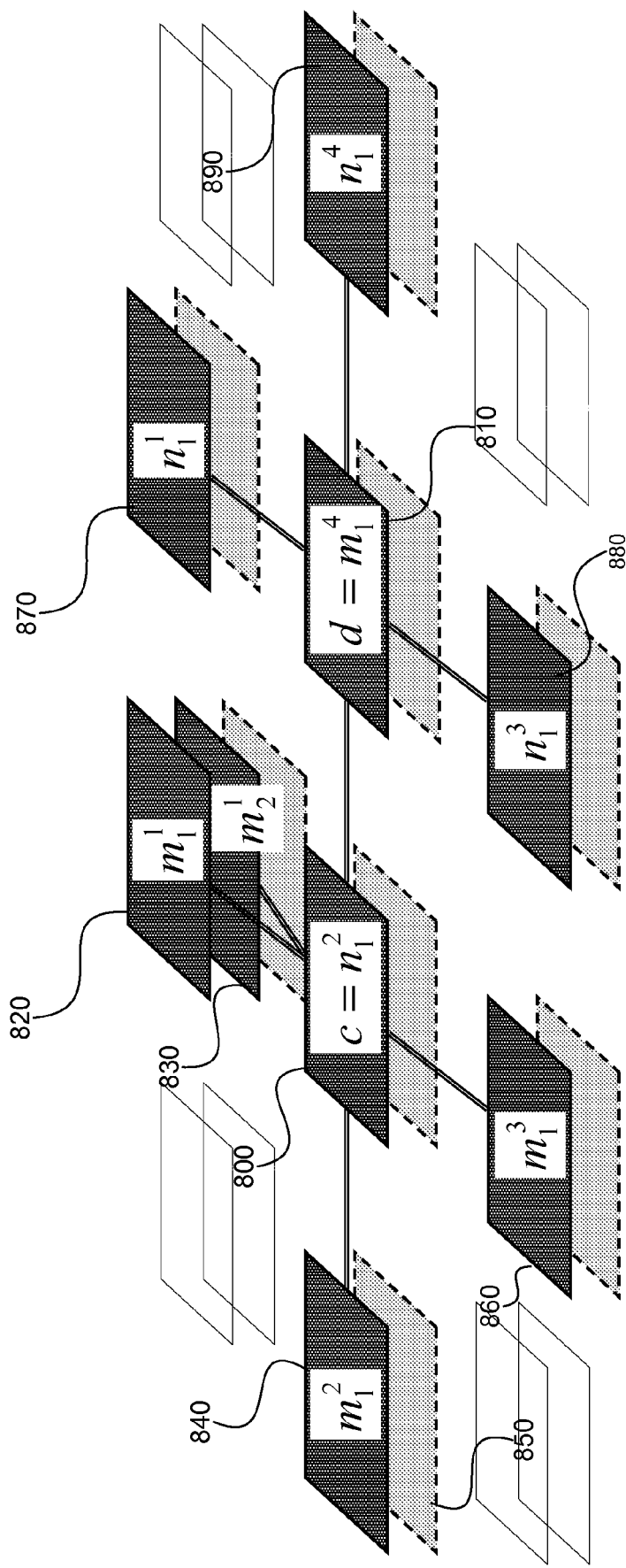
FIG. 8 is a schematic representation of linking mode models.

FIG. 8 is a schematic representation illustrating one embodiment of computing the linking strength. FIG. 8 shows a plurality of mode models 800, 810, 820, 830, 840, 860, 870, 880, and 890 corresponding to a plurality of visual element models. In particular, FIG. 8 shows two matched mode models c 800, and d 810, wherein c 800 and d 810 belong to different visual element models. FIG. 8 also shows some neighbouring mode models 820, 830, 840, 860, 880, and 890. The neighbouring mode models 820, 830, 840, 860, 880, and 890 may or may not be matched. For illustrative purposes, only one visual element model in this example has two mode models. In this example, mode models 820 and 830 belong to the same visual element model. Depending on the embodiment, one or more of the other visual element models can contain additional mode models. Mode model 850 is shown in dotted outline to indicate that, in an alternative embodiment, mode model 850 and mode model 840 relate to the same visual element model. The linking strength is computed as so:

$$\text{linking\_strength}(c,d) = \text{cooccurrence}(c,d)/\min(\text{total\_cooccurence}(c), \text{total\_cooccurence}(d))$$

where:

$$\text{total\_cooccurrence}(c) = \sum_i \sum_j \text{cooccurrence}(c, m_j^i)$$

$$\text{total\_cooccurrence}(d) = \sum_i \sum_j \text{cooccurrence}(d, n_j^i)$$

c 800 and d 810 represent two mode models from different visual element models;

$m_j^i$ is the jth mode model on ith neighbour location of c, 800;

$n_j^i$ is the jth mode model on ith neighbour location of d, 810.

Some example values are shown in Table 1 below:

TABLE 1

| Matched Mode model | Mode model in neighbour location | Co-occurrence |
| --- | --- | --- |
| c | $m_1^1$ 820 | 500 |
|   | $m_2^1$ 830 | 1 |
|   | $m_1^2$ 840 | 500 |
|   | $m_1^3$ 860 | 2000 |
|   | $m_1^4$ = d 810 | 200 |
| d | $n_1^1$ 870 | 100 |
|   | $n_1^2$ = c 800 | 200 |
|   | $n_1^3$ 880 | 400 |
|   | $n_1^4$ 890 | 100 |

The example shown in Table 1 above features a pair of mode models c and d, and it is useful to compute the linking strength between those mode models. Mode model c has four neighbour locations that have five mode models in total, which are listed in the second column in Table 1, namely $m_1^1$, $m_2^1$, $m_1^2$, $m_1^3$ and $m_1^4$. Mode model d has four neighbour locations that have four mode models and the co-occurrences are also listed in the second column in Table 1, namely $n_1^1$, $n_1^2$, $n_1^3$ and $n_1^4$. The co-occurrence between the matched mode model c or matched mode model d and each of the respective neighbouring mode models is listed in the third column in Table 1. The linking strength between m and n is computed as follows:

$$\text{total\_cooccurrence}(c) = 500 + 1 + 500 + 2000 + 200 = 3201$$

$$\text{total\_cooccurrence}(d) = 100 + 200 + 400 + 100 = 800$$

$$\text{linking\_strength}(c,d) = 200/\min(3201, 800) = 200/800 = 0.25.$$

In another embodiment:

$$\text{linking\_strength}(c,d) = \text{cooccurrence}(c,d)/\min(\text{hit\_count}(c), \text{hit\_count}(d)),$$

where hit_count(c) and hit_count(d) are counts of the number of frames in which the mode models c and d, respectively, have been chosen as the matched mode model (since the creation of the mode).

Table 2 below shows another example having a pair of mode models c and d, and which is useful to compute the linking strength between mode models c and d. Mode model c has four neighbour locations that have five mode models in total, which are listed in the second column in Table 2 as $m_1^1$, $m_2^1$, $m_1^2$, $m_1^3$ and $m_1^4$. Mode model d has four neighbour locations that have four mode models, also listed in the second column in Table 2 as $n_1^1$, $n_1^2$, $n_1^3$ and $n_1^4$. The co-occurrence between the matched mode models and every mode model in the neighbour location is listed in the third column in Table 2. The hit count of each of the neighbouring mode models is listed in the fourth column of Table 2. The linking strength between mode model c and mode model d is computed as follows:

linking_strength(c,d)=200/min(2000,600)=200/600=0.333

TABLE 2

| Matched Mode model | Mode model in neighbour location | Co-occurrence | Hit count |
|---|---|---|---|
| c | $m_1^1$ 820 | 500 | 550 |
|   | $m_2^1$ 830 | 1 | 1 |
|   | $m_1^2$ 840 | 500 | 600 |
|   | $m_1^3$ 860 | 2000 | 2000 |
|   | $m_1^4$ = d810 | 200 | 600 |
| d | $n_1^1$ 870 | 100 | 200 |
|   | $n_1^2$ = c800 | 200 | 2000 |
|   | $n_1^3$ 880 | 400 | 600 |
|   | $n_1^4$ 890 | 100 | 150 |

In the embodiment above, the linking strength is symmetric between two mode models. In another embodiment, the calculation of linking strength is directional, such that the linking strength between mode model c 800 and mode model d 810 depends on which mode model is considered and which one is the neighbour. When c is considered with d as a neighbour, the linking strength is calculated:

linking_strength(c,d)=cooccurrence(c,d)/hit_count(c)

So, using the same example values from Table 2, this gives:

linking_strength(c,d)=200/2000=0.1

In yet another embodiment, the linking strength is normalised by the total co-occurrence of the considered mode model, and the calculation is:

linking_strength(c,d)=cooccurrence(c,d)/total_cooccurrence(c)

Using the same example values from Table 1 and the previously calculated total co-occurrences, provides:

linking_strength(c,d)=200/3201=0.0625.

Co-occurrence is bi-directional, thus:

cooccurrence(c,d)=cooccurrence(d,c).

Because the linking strength is directional, the definition changes if d 810 is considered with c 800 as a neighbour. The linking strength is:

linking_strength(d,c)=cooccurrence(c,d)/hit_count(d)

So, using the same example values from Table 2, gives:

linking_strength(d,c)=200/600=0.333.

In the embodiment which uses the total co-occurrence, the linking strength from d 810 to c 800 is:

linking_strength(d,c)=cooccurrence(c,d)/total_cooccurrence(d)

Using the same example values from Table 1 and the previously calculated total co-occurrences, gives:

linking_strength(d,c)=200/800=0.25.

It will be appreciated by a person skilled in the relevant art that other means of the calculation of the linking strength using the co-occurrence may equally be practised, and that the calculated linking strength will have subtly differing meaning as a result.

The linking strength is used to determine whether the linking between two mode models is strong or not. One embodiment for determining whether the linking is strong compares the linking strength with a predetermined threshold, say 0.5. If the linking strength is greater than or equal to the threshold, then the linking is classified as being strong. Otherwise, if the linking strength is less than the threshold, then the linking is classified as being weak. If the linking strength is strong and the two mode models belong to the same classification, for example by being both foreground or both background or both sharing a common maturity or activity count, for example a maturity level or recent activity, then the neighbour has a selected mode model that is temporally similar to the candidate mode model, and the spatial support for that candidate mode model is increased. Otherwise, the spatial support remains unchanged.

The process is repeated for all candidate mode models and all neighbours. For example, if there are three neighbours with a selected mode model that is temporally similar to a candidate mode model, and one neighbour with weak linking, then the spatial support is 3.

Embodiments of the presently described methods provide improved correlations between visual elements in a scene that represent the same real-world object. These embodiments correctly identify correlation, even if different visual elements corresponding to the same real-world object have different activity counts or creation times. Further, implementations of the methods do not require data to be available beyond the current frame of the video, and so arrangements according to the present disclosure can be applied to live video streams. Embodiments according to the present disclosure further do not require any training data or an initialisation period.

Figure 10A:
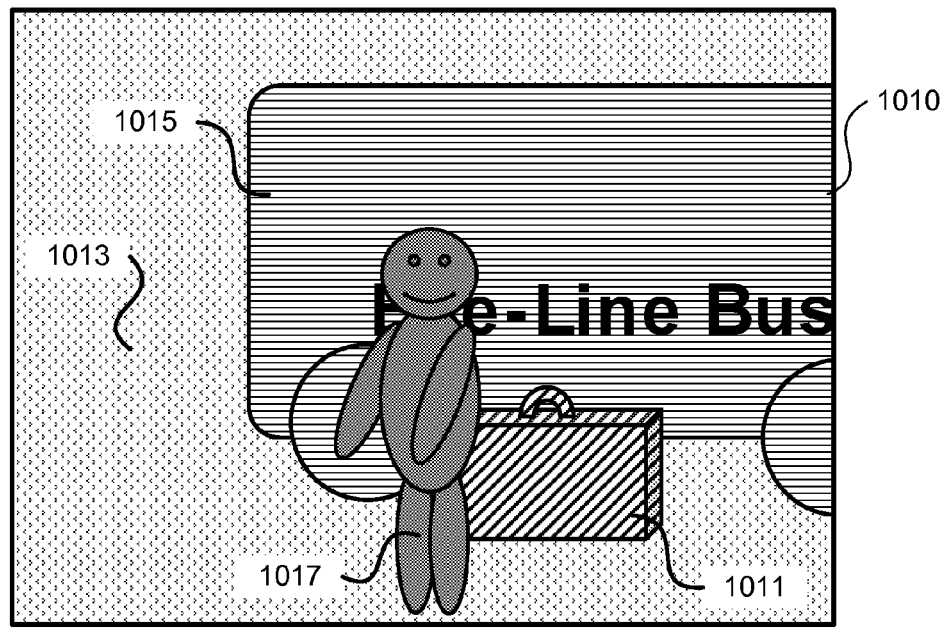
FIGS. 10a to 10h illustrate a set of mode models representing visual element models resulting from a scene, and different methods of scene reconstruction resulting from different algorithms after the removal of a foreground element.

FIG. 10a is a schematic representation of a frame of a video frame, 1010, which has a scene background 1013, a suitcase 1011, a bus 1015 positioned behind the suitcase 1011 and a person 1017 in front of both, occluding part of the suitcase 1011 and part of the bus 1015. In the example of FIG. 10a, it is desired to produce a representation of the scene without the person 1017.

A confounding scenario for some scene construction or reconstruction techniques is when the depth-ordering of the scene does not match the temporal history of the scene. For example, the suitcase 1011 has been in the video for some time, the bus 1015 is parked behind the suitcase at a later time, and at a still later time the person 1017 walked in front of the bus 1015 and the suitcase 1011, partially occluding the name of the bus company.

Figure 10B:
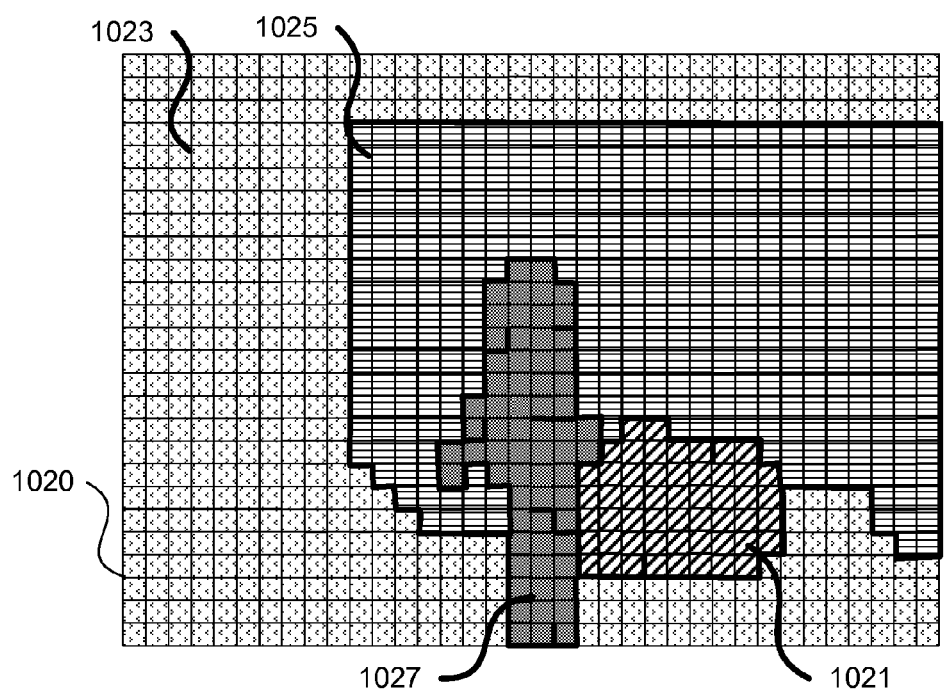

The visual element models in the scene model corresponding to the video frame 1010 each have corresponding matched mode models, called here scene mode models 1020, illustrated in FIG. 10b. The scene mode models 1020 can be grouped according to the object to which they correspond. Some mode models 1025 correspond to the bus 1015, some mode models 1021 correspond to the suitcase 1011, some mode models 1023 correspond to the scene background, and some mode models 1027 correspond to the person 1017. If the area 1027 corresponding to the person 1017 is treated as unknown, then the correct scene mode models in the visual element model locations corresponding to the person 1027 are unknown. The rest of the scene mode models 1020 are known, as they are matched mode models.

Figure 10D:
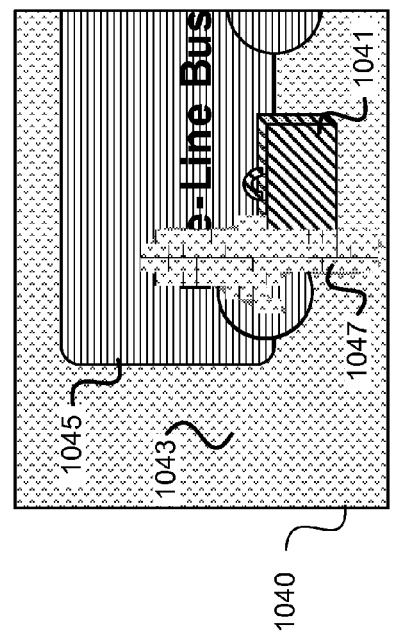
Figure 10F:
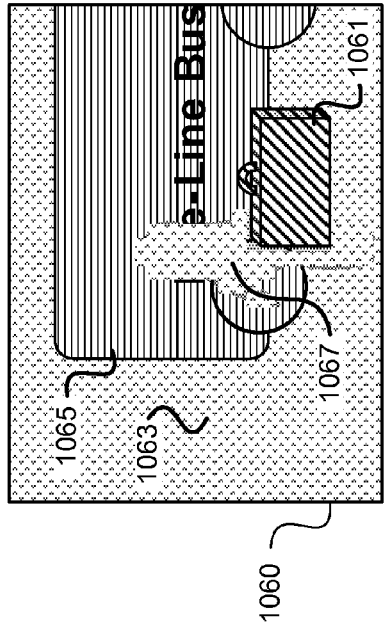
Figure 10C:
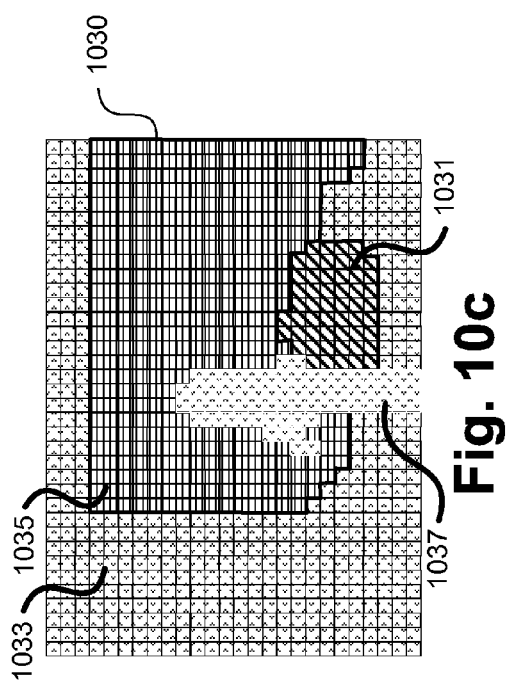

If the mode models with the oldest creation time are chosen as the scene mode models, as represented in FIG. 10c, then the mode models 1037 of the chosen region where the person 1017 was includes only scene background mode models 1033, since the scene was initially empty.

FIG. 10d shows a reconstruction 1040 of the scene of FIG. 10a from the chosen mode models of 1030 of which 1040 includes only partial images of the bus 1045 and the case 1041 from their respective mode models 1035 and 1031, but only as visible in the original frame, with the region 1047 of the person 1017 shown only as scene background 1043. The "reconstruction" of the scene may also or alternatively be considered a "construction" of the scene from the models.

If a threshold time is used for reconstructing the scenes, then there is some improvement but the result is still not as desired. According to the example of FIG. 10e, the chosen scene mode models 1050 of the frame, do include some mode models 1052 from the otherwise occluded part of the suitcase 1051, but the rest of the mode models corresponding to the person 1057 are still categorised as scene background 1053, instead of being the desired mode models from the bus 1055.

Figure 10E:
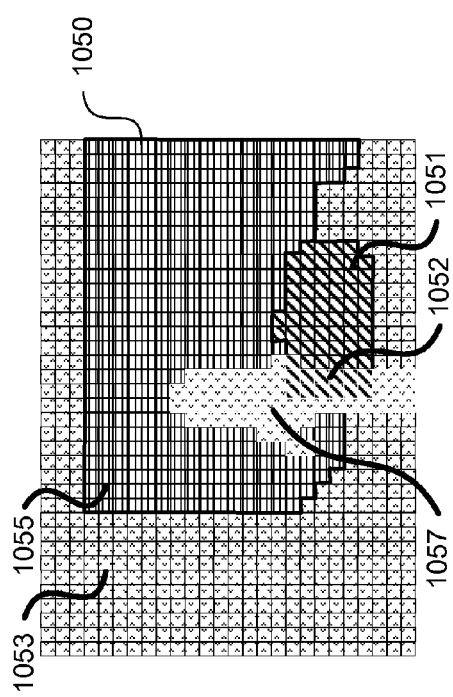

FIG. 10f shows a reconstruction 1060 of the scene in FIG. 10a from the mode models chosen in FIG. 10e, which depicts the suitcase 1061 correctly, but there is still a hole in the shape of a person 1067, filled with background 10 and encroaching into the background 1063 and the reconstruction of the bus 1065. Although it might be possible in some examples to choose a threshold which would produce the desired results, there are also cases where no perfect threshold exists at all. If for example, the person 1017 was visible in the scene earlier, but had moved to a different location in the scene since the start of the video, then there will be no history threshold where the person is absent entirely from the reconstruction.

Figure 10G:
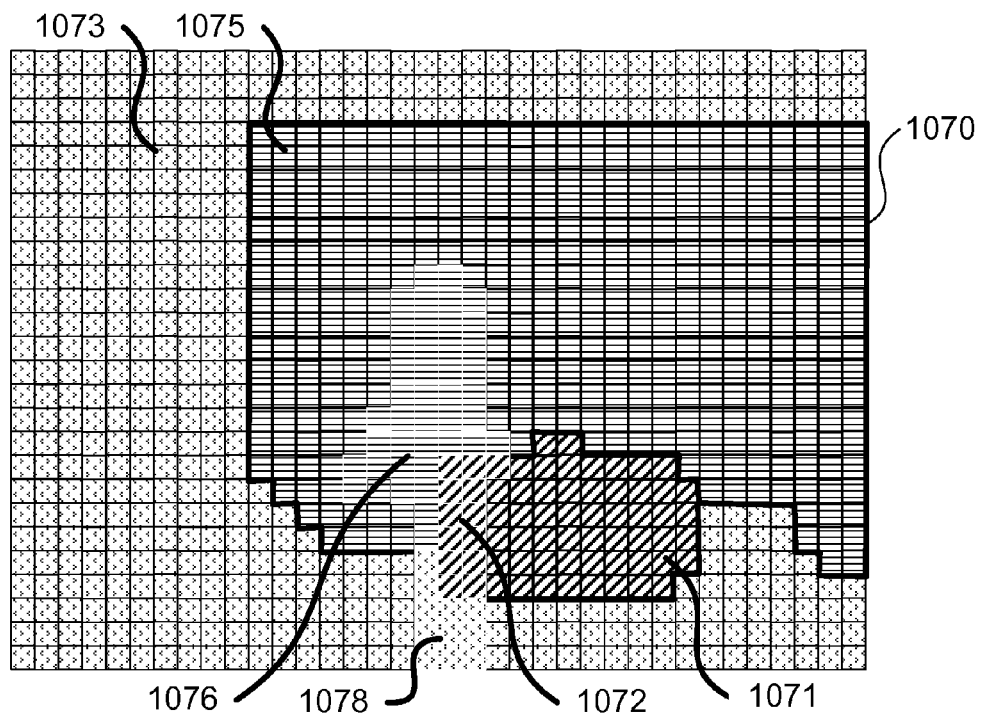

The desired state is to choose scene mode models 1070 as shown in FIG. 10g, 1070, which complete the occluded part 1072 of the suitcase 1071, the occluded part 1076 of the bus 1075, and the occluded part of the scene background 1073 only where appropriate 1078. If it was possible to make such a choice, then a reconstruction 1080 of FIG. 10h, 1080, based on these could contain the suitcase 1081, background 1083, and bus 1085 correctly.

Figure 11A:
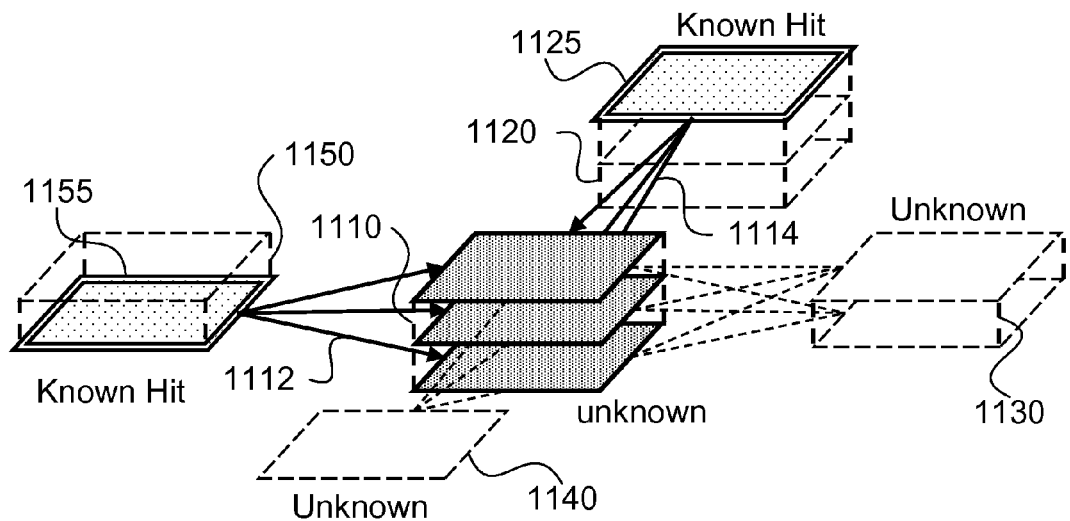
FIG. 11a schematically illustrates the relationships between two recently-matched mode models in visual element models, and the mode models of a neighbouring visual element model.
Figure 11B:
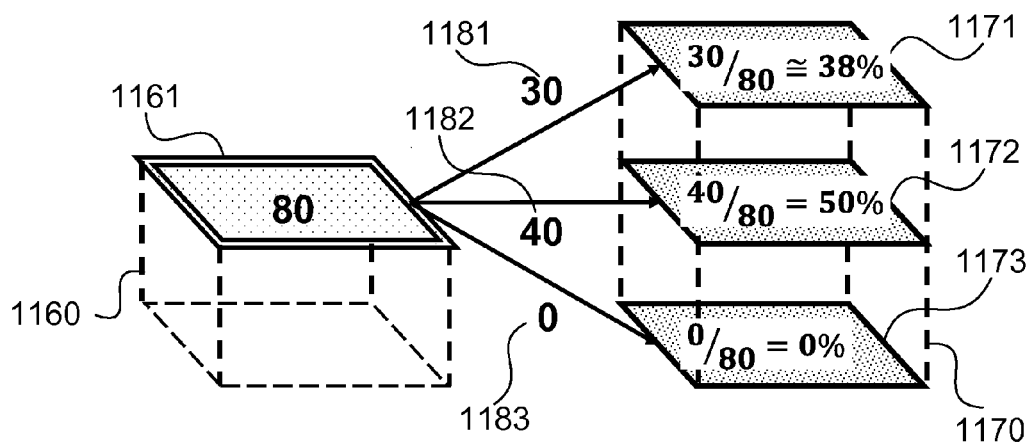
FIG. 11b is a schematic representation for explaining a method of calculation of association probability of each of a set of mode models in a visual element model, with a neighbouring visual element model.

FIG. 11a is a schematic representation showing a visual element model 1110, for which the best reconstructed scene mode model is currently unknown. Two connected visual element models 1130 and 1140 have a similarly unknown best-state, but another two connected visual element models 1120 and 1150 have known scene mode models 1125 and 1155 respectively. The best reconstructed scene mode model for visual element 1110 can be chosen based on the connections 1114 from the first known mode model 1125 and the connections 1112 from the second known mode model 1155. FIG. 11b is a schematic representation showing one embodiment of a calculation for calculating the strength of the relationships 1181, 1182, and 1183 between a known mode model 1161 in one visual element model 1160, and the mode models 1171, 1172 and 1173 of another visual element model 1170. In the embodiment shown, the relationship strength is represented as a probability, calculated by the relative co-occurrence of the relationship against a stored value measuring the occurrence (also known as hit count) of the known mode model. In another embodiment, the relationship measure is calculated relative to the occurrence of each unknown mode model. In yet another embodiment, the relationship probability is calculated relative to the sum of all the relationship co-occurrences stemming from the known mode, a sum which would typically be less than the mode model occurrence, since mode models are sometimes deleted, or expire. In other words, the mode model in the visual element 1110 with the maximum relative co-occurrence with at least one of the mode model 1125, 1155 is chosen as the best background mode model for the visual element 1110. In yet another embodiment, the relationship strength is represented as an integer sum of its co-occurrences.

Figure 12:
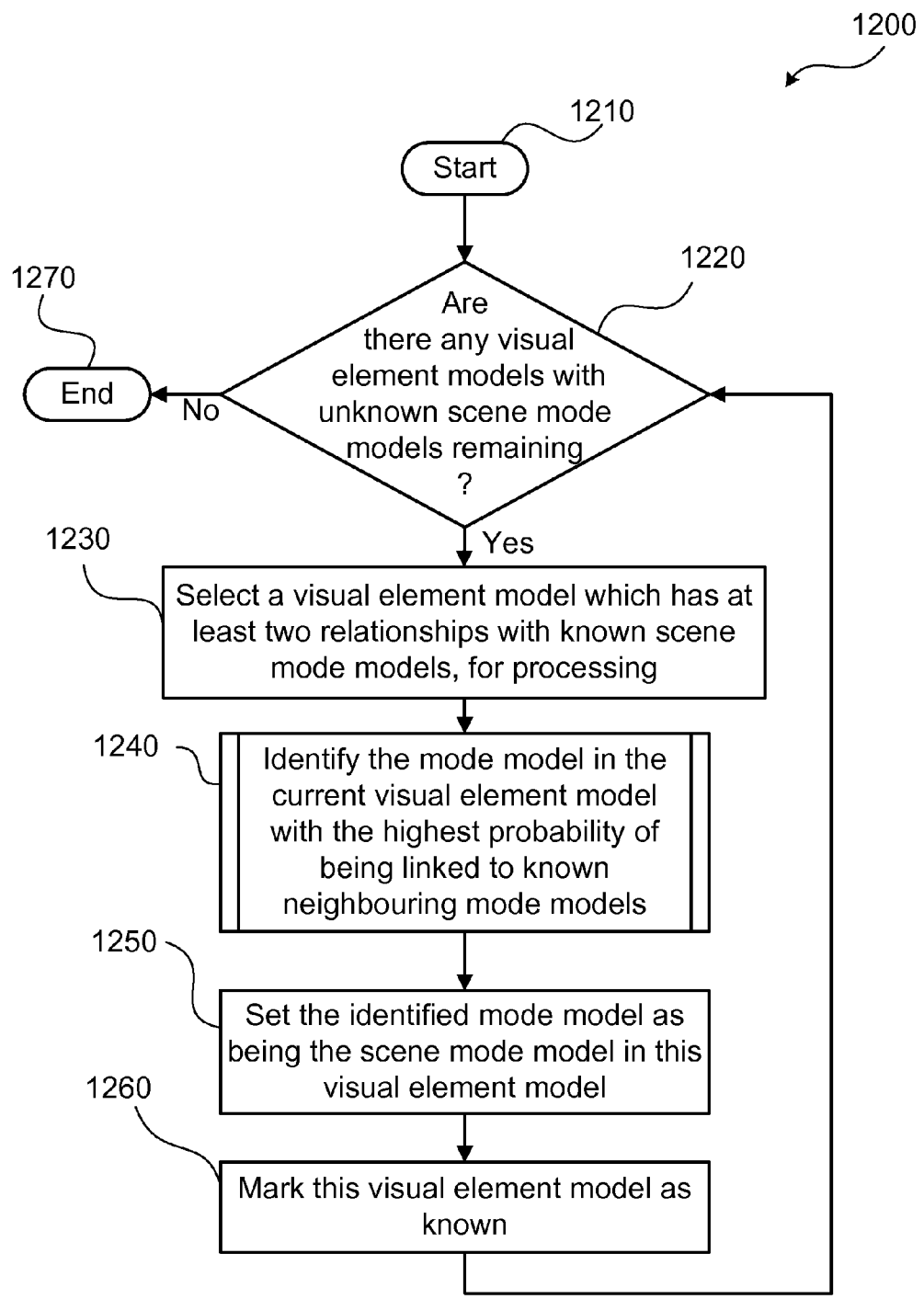
FIG. 12 is a schematic flow diagram illustrating a method of filling-in unknown mode model choices from known mode models.

FIG. 12 is a flow diagram of a process 1200 for iteratively identifying mode models to identify a most-likely set of scene mode models given the available information in a given frame. Like the methods before, the process 1200 is may be implemented in software stored in the memory 106/306, 310 and executable by the processor 105/305.

The process 1200 begins at step 1210 when known scene mode models and the unknown visual element models are identified by the processor. In step 1220, the processor tests if there are any unknown visual element models remaining 1220, and if Yes, then the process 1200 proceeds to step 1230.

In step 1230, the processor selects an unknown visual element model which has at least two relationships with known scene mode models. In another embodiment, it is not necessary that the visual element model has two relationships with known scene mode models, a single one is sufficient. In another embodiment, the known scene mode model(s) must meet an additional requirement, for example being connected to the mode models associated with a particular object in the scene whose appearance is to be reconstructed. In yet another embodiment the matched mode models are sorted for example by creation time of the mode model, and a visual element model connected to the most-recently-created mode model is selected. In yet another embodiment, the visual element models have their relationship strengths and probability calculations performed in advance, and the entire process according to 1200 is modified to identify as known, those unknown mode models with the highest probability at each step.

Once a visual element model is selected, the mode model within the visual element model which has the highest probability of being the desired scene mode model is identified by the processor at step 1240. The processor 305 then sets the status of this identified mode model as known in step 1250, and the corresponding visual element model is then marked in step 1260 as being known, before control returns to a check for more unknown visual element models in step 1220.

If, at step 1220 there are no more remaining visual element models which are unknown, No, then the process ends at step 1270.

Figure 13:
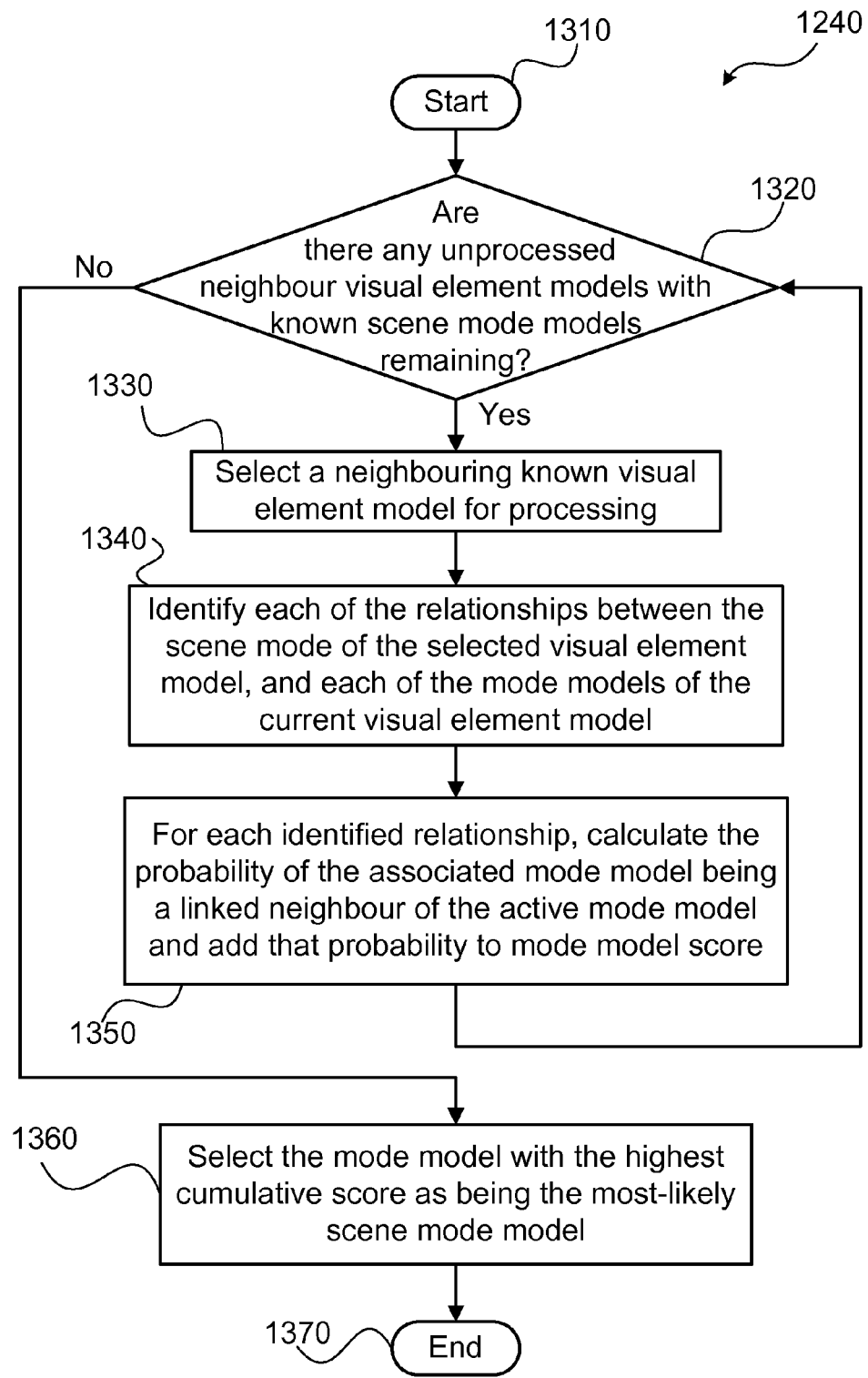
FIG. 13 is a schematic flow diagram illustrating the calculation of the probability of a mode model being linked to a set of neighbours, which is one element of FIG. 12.

FIG. 13 is a flow diagram showing more detail of the process 1240 by which the processor identifies the most-likely scene mode model.

The process 1240 starts at step 1310 with a selected visual element model from step 1230 which has relationships with known scene mode models in neighbouring visual element models. A check is made by the processor at step 1320 to see whether there are any neighbours which have not yet contributed a score to the current calculation. If there are any unprocessed neighbours, Yes, then one of those neighbours is selected at step 1330 for processing.

Once a neighbour with a known scene mode model is selected 1330, in the next step 1340 the processor identifies each of the relationships between the known scene mode model in the selected neighbour visual element model, and the mode models of the unknown visual element model. With the relationships identified, in step 1350 the processor calculates 1350 the likelihood of each unknown mode model being associated with the known mode model, as the example in FIG. 11b showed. These probabilities are added to a cumulative score, and the process returns to the check for further known neighbouring mode models 1320.

If, at the check step 1320, there are no more known neighbouring mode models, No, then control passes to step 1360. In this step, the mode model in the unknown visual element model with the highest cumulative likelihood score is selected as being the most likely mode model in the visual element. The process ends 1370, and control passes back to step 1250.

Figure 14A:
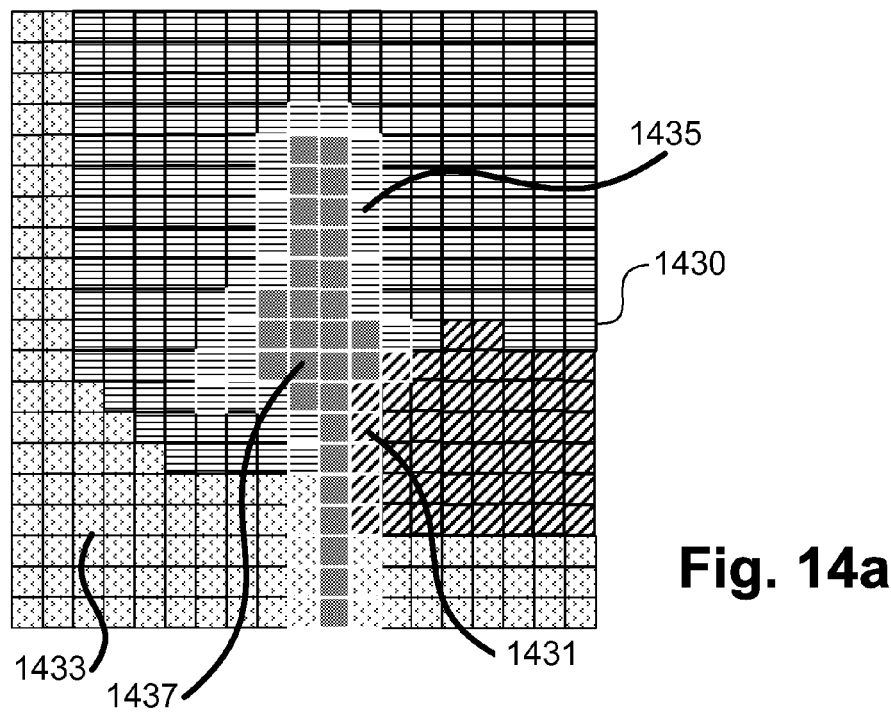
FIGS. 14a and 14b show the scene reconstruction process from the method of FIG. 13, in more detail.
Figure 14B:
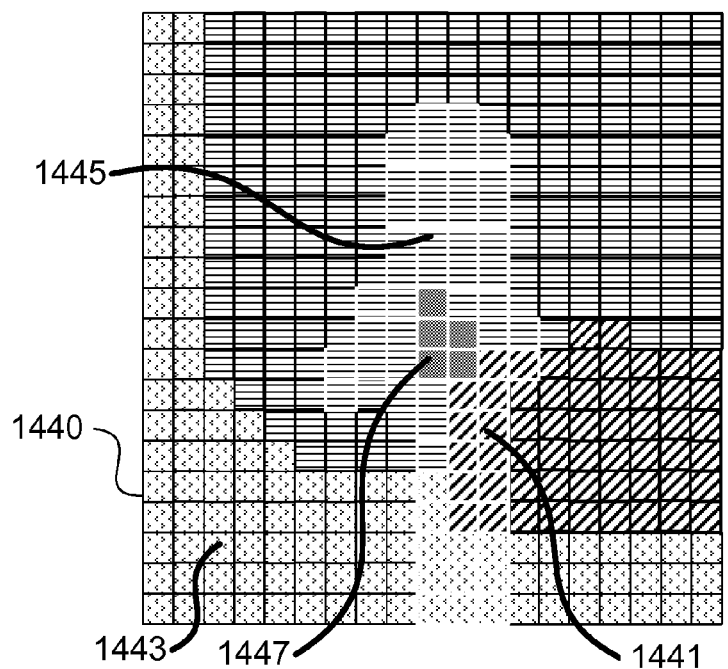

FIGS. 14*a* and 14*b* are schematic representations showing the reconstruction of the scene from FIG. 10*a* using the methods described in FIGS. 11, 12, and 13.

For context, refer to FIG. 10*a* being a sample scene, and FIG. 10*b* as the scene mode models representing that scene. The reconstruction of the scene area occluded by the person 1017 begins at the edges of the person as seen in FIG. 14*a*, as those mode models have known scene model neighbours. Whilst the reconstruction is iterated, an intermediate view 1430 of the selected mode models may be displayed on the display device 314, in which the mode models 1431 representing the suitcase 1011 are seen extending into a region 1437 previously occupied by the person 1017, as are the mode models 1435 and 1433 corresponding to the bus 1015 and the background 1013, respectively. These mode models 1431, 1433, and 1435 are chosen based on their relationships with surrounding modes 1021, 1023, and 1025 respectively. As seen in FIG. 14*b*, as the iteration continues 1440, more of the mode models 1441 corresponding to the suitcase 1011 are selected, as are the mode models 1445 and 1443 corresponding to the bus 1015, and background 1013, leaving very few unknown mode models 1447 where the person 1017 was previously located.

Figure 10H:
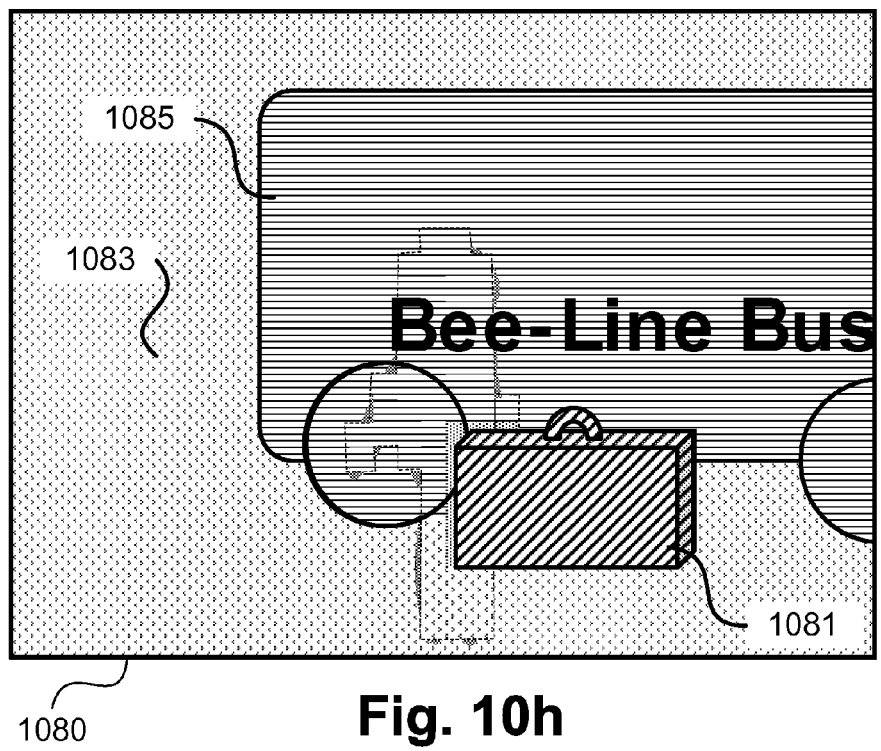

Referring now to FIG. 10*g*, when the iteration has been completed, it is seen that the mode models in the previously unknown locations 1072, 1076, and 1078, have been identified correspondingly as the suitcase 1011, background 1013, and bus 1015 respectively. As seen in FIG. 10*h*, the reconstructed image 1080 shows the suitcase 1081 and background 1083, which have been reconstructed in full by filling in the unknown mode models to obtain a set of background mode models. The bus 1085 has also been reconstructed, revealing the remainder of the bus company name (Bee-Line Bus). The order of the recursive fill-in is preferably chosen to work inwards to fill in visual elements with unknown mode models based on a chosen set of known mode models in the scene model. Nevertheless, the arrangements described may be operated in any order.

The image 1080 in FIG. 10*h* depicts some artefacts as a visual guide to the previous location of the person 1017, but these are for illustrative purposes only in the present patent specification, the process 1200/1240 does not necessarily leave any visible artefacts in the reconstructed image 1080.

Figure 15A:
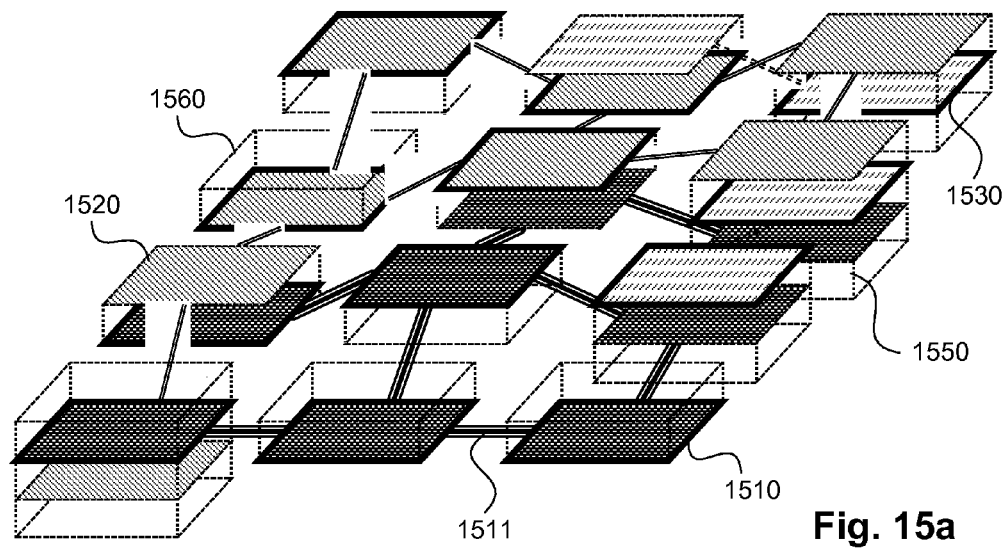
FIGS. 15a, 15b and 15c schematically represent three different layers of connected mode models.
Figure 15B:
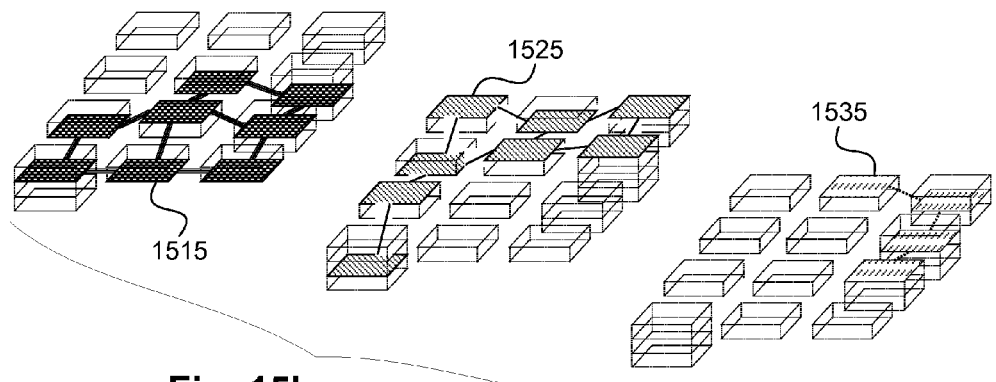
Figure 15C:
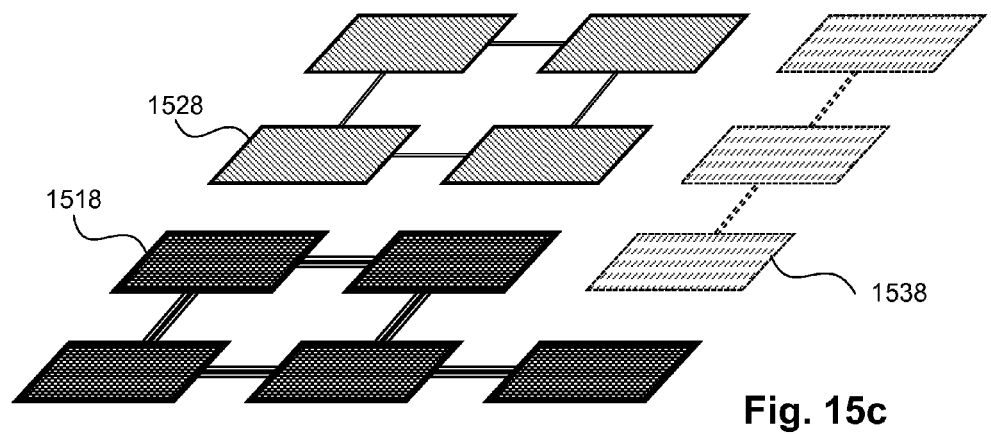

FIGS. 15*a*, 15*b* and 15*c* schematically represent three separate "layers" of mode model information, in a set of visual element models, shown together in FIG. 15*a*, and seen separated out in FIG. 15*b* as 1515, 1525, and 1535. In FIG. 15*a*, the mode models of each layer, such as mode model 1510 may be seen to be joined by strong relationships such as 1511. The layers overlap such that, for example a single visual element model 1550 can contain mode models from all three layers. There are also mode models in this schematic representation, such as mode model 1560 which are not necessarily parts of any layer.

In addition, certain mode models such as mode model 1510 and mode model 1530 are marked with a darker border to illustrate that they are the matched mode model at a given time, that time being associated with the frame whose visual elements were matched to the matched mode models. Other mode models, such as mode model 1520 are not matched. In FIG. 15*a*, there is one matched mode model per visual element model.

The overlapping layers from FIG. 15*a* are separated out for clarity in FIG. 15*b*, so that the layer corresponding to mode model 1510 can be seen alone in 1515, the layer corresponding to mode model 1520 can be seen alone in 1525, and the layer corresponding to mode model 1530 can be seen alone in 1535.

Although reconstructing all (or most) of the modes into layers is a quasi-3D model of the scene content is a highly desirable concept, as illustrated clearly in FIG. 18, the present inventor has found this is not often possible or practical to attempt with real data. Nevertheless, it is however, quite feasible and computationally robust to take only the matched modes at a given time (FIG. 15*c*), which are guaranteed to have relationships (at least from their most recent co-occurrence), and decide whether they are co-linked or not (as per FIG. 17). This co-linking can then be extended to a segmentation of the current frame (via the matched modes of the current frame). Other references are made throughout this description to checking links only between matched modes to achieve segmentation.

In an exemplary embodiment, the matched mode models, such as mode model 1510, are considered with their relationships, such as the relationship 1511. Then, at the time at which the mode models are matched, using only those mode models which were matched from each visual element model, a segmentation can be formed based on the relationship between the selected mode model and the mode models in neighbouring visual elements. An example of the result of this segmentation is shown in FIG. 15*c* as exemplary segments 1518, 1528, and 1538. In other words, once the mode models are matched with input mode models, the matched mode models are checked for co-occurrence values. If the relationships between matched mode models are high, then the mode models are grouped into the same segment in the segmentation process.

Figure 16A:
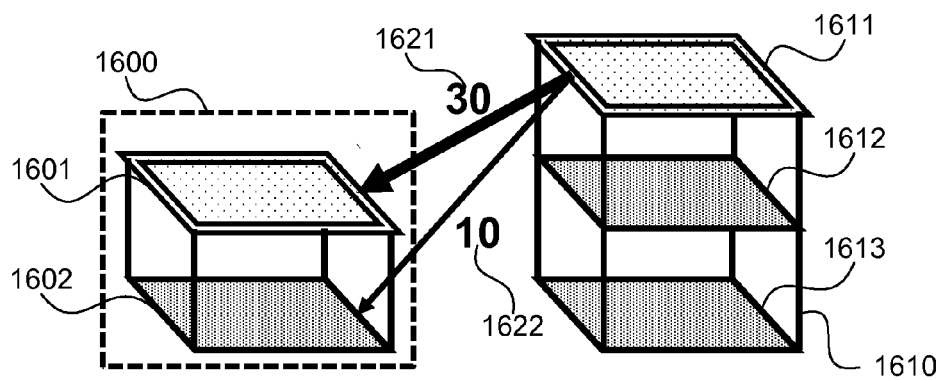
FIGS. 16a, 16b, and 16c are schematic representations depicting different relationships between sets of mode models in two visual element models.

FIG. 16*a* is a schematic representation showing two adjacent visual element models 1600 and 1610, the first model 1600 having mode models 1601 and 1602, and the second model 1610 having mode models 1611, 1612 and 1613. In FIG. 16*a*, mode models 1601 and 1611 are under consideration to find if they are in the same layer or not, so are drawn with a different outline style from the other mode models 1602, 1622, and 1623. In one embodiment, these two mode models 1601 and 1611 are considered because the two mode models 1601 and 1611 are the matched mode models in their respective visual element models. In another embodiment, mode models 1601 and 1611 are considered because all combinations are being considered in turn. The processor 305 determines whether the relationship between the two mode models 1601 and 1611 is strong (for example, via step 650). By considering mode model 1611, all the mode models in visual element model 1600, 1601 and 1602 are selected. Mode model relationships 1621 and 1622 are examined, which are between mode model 1611 and the two mode models 1601 and 1602, respectively.

In this example, the strength of the relationship 1621, is valued at, for example 30, is stronger than the strength of relationship 1622, valued at, for example 10. In one implementation, the relationship strength is the co-occurrence between the two mode models. In another implementation, the relationship strength is calculated based on other properties of the relationship. In yet another implementation, the relationship strength is calculated based on properties of the relationship in combination with properties of the associated mode models.

Figure 16B:
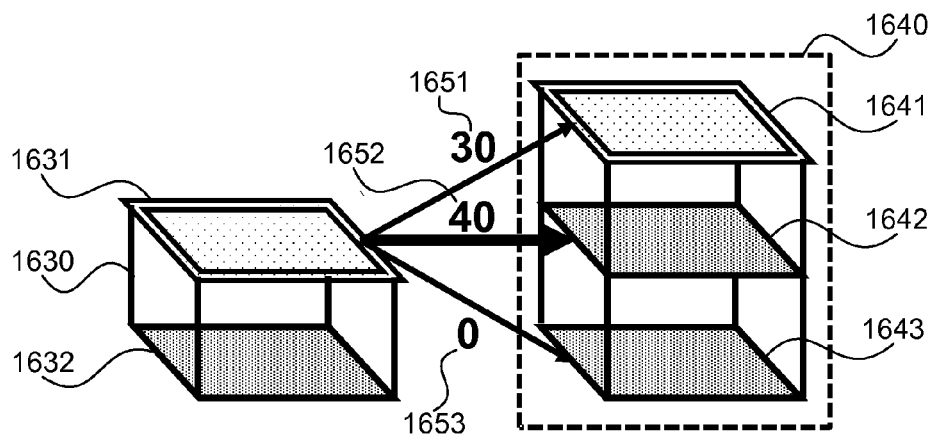

FIG. 16b is a schematic representation showing the same two adjacent visual element models, 1630 and 1640, corresponding to those in FIG. 16a, namely 1600 and 1610 respectively. Visual element model 1630 has mode models 1631 and 1632 and in this example it is desired to test the strength of the relationships to mode model 1631. Visual element model 1640 is selected, containing mode models 1641, 1642, and 1643. Relationships 1651, 1652, and 1653 are associated with those three mode models respectively. In this example the strength of relationship 1652, valued at 40, is the strongest, more than the strength of relationship 1651, valued at 30, or relationship 1653, valued at 0.

Figure 16C:
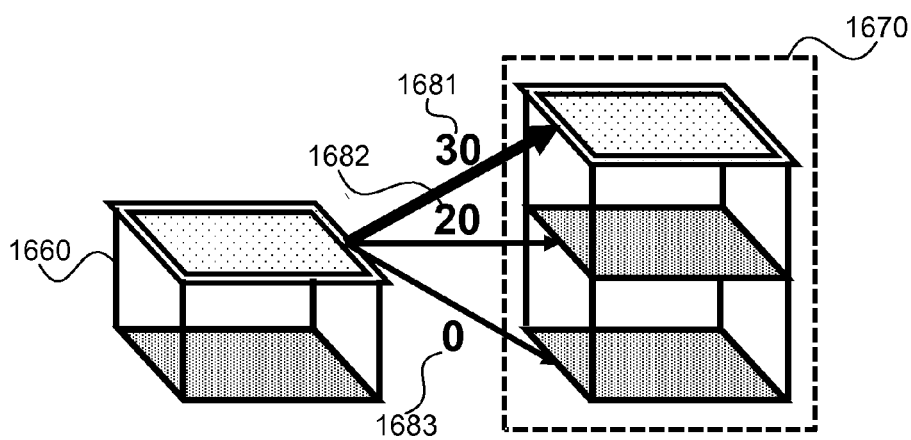

FIG. 16c is a schematic representation showing the same two adjacent visual element models 1660 and 1670, corresponding to FIG. 16b, namely visual element models 1630 and 1640 respectively. The same three relationships 1681, 1682, and 1683 as are shown in FIG. 16b, as 1651, 1652, and 1653 respectively. In this representation however, the relationship 1682 has a smaller value, valued at 20. As a result of this change, the relationship 1681 is now the strongest.

FIG. 16a does not contradict either of FIG. 16b or 16c, and FIGS. 16a to 16c therefore show two scenarios, one in which FIG. 16a and FIG. 16b are considered, and one in which FIGS. 16a and 16c are considered. To classify two mode models in the same segment or layer, the relationship is a maximum of a set of relationships between the one mode model with mode models in another visual element, and vice versa. For example, in the case of FIG. 16a and FIG. 16b, the co-occurrence 1621 between mode model 1601 and mode model 1611, being 30, is the maximum of the set of co-occurrence between the mode model 1611 with mode models in the visual element 1600, but is not the maximum (1651) between the mode models 1601 and 1630 with the set of mode models in visual element 1640. Thus, the mode models 1601 and 1611 do not belong to the same layer. On the other hand, in the case of FIGS. 16a and 16c, the co-occurrence 1621, 1681 between mode model 1601 and mode model 1611, which is 30, is the maximum of the set of co-occurrence between the mode model 1611 with mode models in the visual element 1600. The co-occurrence 1681 between the mode model 1601, 1660 is also the maximum of the set of co-occurrence values with the set of mode models in visual element 1670. Thus, the mode models 1601, 1660 are considered to be of the same object layer as the mode model 1611.

In one implementation, the two visual element models in FIGS. 16a to 16c correspond to adjacent visual elements. In another implementation, the visual element models are separated by a fixed distance. In yet another implementation, the visual element models can be any two visual element models between which a relationship may be formed.

Figure 17:
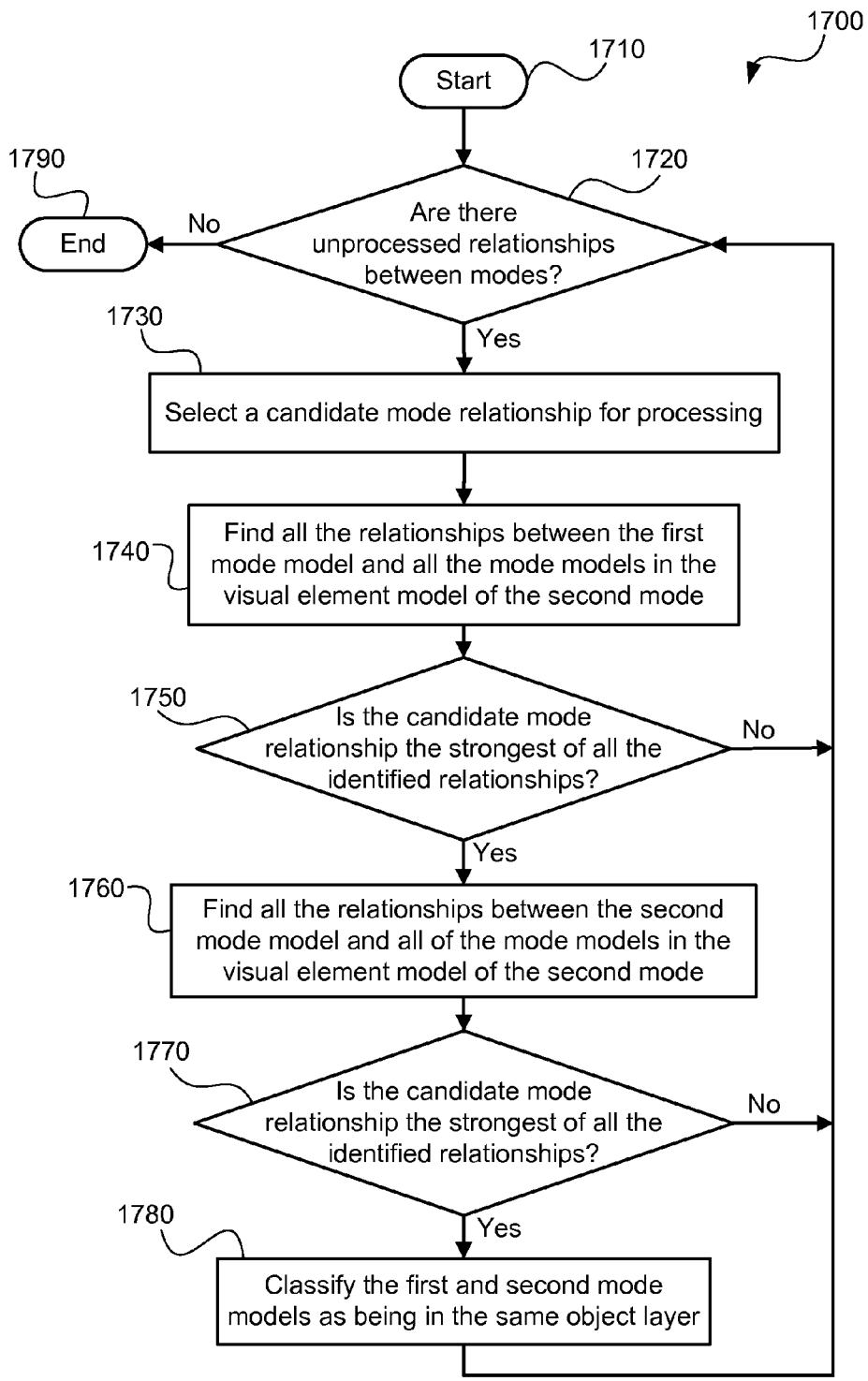
FIG. 17 is a schematic flow diagram illustrating a method of joining two mode models based on the relationship information.

FIG. 17 is a flow diagram showing an exemplary method 1700 whereby mode models with known relationships (e.g. co-occurrences) can be classified as belonging to the same layer or not. Desirably the method 1700 is implemented using software stored in the memory 106/306, 310 and executable by the processor 105/305. In one embodiment, this method can be used to test all relationships in a scene model to form a layered segmentation of the scene. In another embodiment, this method can be used only on relationships between matched mode models, thereby achieving a segmentation of the incoming frame. The incoming frame is segmented by separating all visual elements from each other, and then re-connecting those visual elements whose corresponding mode models are in the same object layers. In another embodiment the method 1700 of FIG. 17 may be used to add mode models to a layer in an expanding model from a seed location, whereby as each new mode model is added to the same layer, all of the relationships associated with that mode model are added to a list to be checked. In other words, the two mode models are associated when the co-occurrence meets a first pre-determined criterion for a first set of co-occurrences between the current mode model and a set of mode models in the adjacent visual element as well as a second pre-determined criterion for a second set of co-occurrences between the mode model in the adjacent visual element and a plurality of mode models in the current visual element.

Other implementations of the method 1700 include having a criterion that:
(a) the co-occurrence relationship is at least a pre-determined fraction of a maximum of the set of co-occurrences,
(b) the co-occurrence is within a pre-determined threshold amount of a maximum of the set of co-occurrences, or
(c) the co-occurrence is located at least at a pre-determined position in an ordered list of the co-occurrences.

The method 1700 may associate the second mode model with the first mode model in the event that:
(a) the co-occurrence is a maximum of a first set of co-occurrences between the first mode model and a plurality of mode models in the second visual element model; and
(b) the co-occurrence is a maximum of a second set of co-occurrences between the second mode model and a plurality of mode models in the first visual element model.

The process 1700 begins at a start step 1710 where a scene model is received form memory 106/306 or otherwise identified by the processor 105/305. In a first step 1720, the processor determines whether there are still any relationships between mode models which should be processed. If there are, Yes, then the process 1700 proceeds to a select step 1730 where a candidate mode model relationship (for example mode model 1621) is selected for processing. This involves identifying the first mode model (for example mode model 1601) and the second mode model (for example mode model 1611) for which the relationship is between, and also the first visual element model (for example mode model 1600) and the second visual element model (for example mode model 1610), which contain the first and second mode models respectively.

The process 1700 then performs a first test 1740 of the selected relationship, to find all of the relationships between the first mode model and the mode models of the second visual element model. A test 1750 is then performed by the processor to determine whether the candidate relationship is the strongest of all of these relationships. If the relationship is not the strongest, No, then the process 1700 returns to step 1720 to the check for more unprocessed relationships. If the relationship is the strongest, Yes, then the process 1700 proceeds to a second test 1760 of the selected relationship.

In the second test 1760 of the selected relationship, the processor operates to find all of the relationships between the second mode model and the mode models of the first visual element model. A test 1770 is then performed to determine whether the candidate relationship is the strongest of all of these relationships. If the candidate relationship is not the strongest, No, then the process 1700 return to step 1720 to the check for more unprocessed relationships. If the candidate relationship is the strongest, Yes, then the process 1700 proceeds to step 1780 where the processor classifies the first and the second mode model as being in the same object layer. The classification may be stored in memory 106/306,310. The process 1700 then returns to step 1720 to the check for more unprocessed relationships.

It is further noted that where two modes are not identified or otherwise established as related, such does not mean that they are not in the same object layer. Such only means that it is not known whether they are in the same object layer. The modes may transpire to be related via other linked modes.

If there are no more unprocessed relationships, as tested at step 1720, No, then the method 1700 ends at step 1790.

Figure 18A:
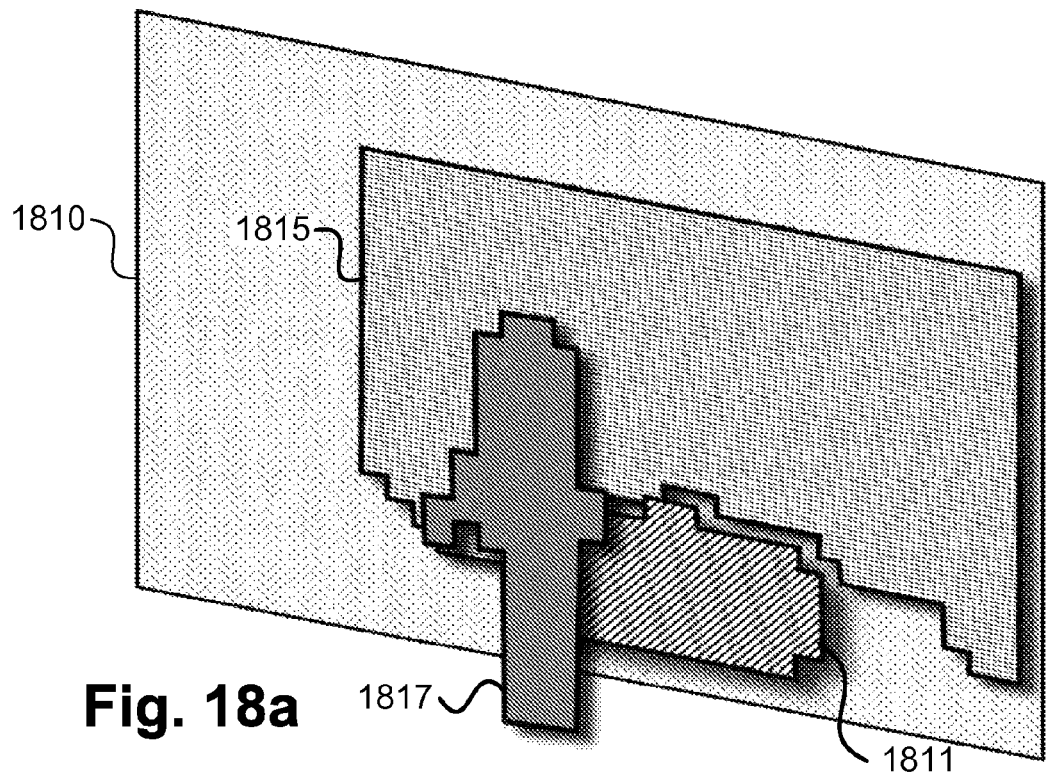
FIGS. 18a and 18b illustrate mode model layers resulting from the analysis as per FIG. 16 and FIG. 14, and the corresponding reconstructed image layers.
Figure 18B:
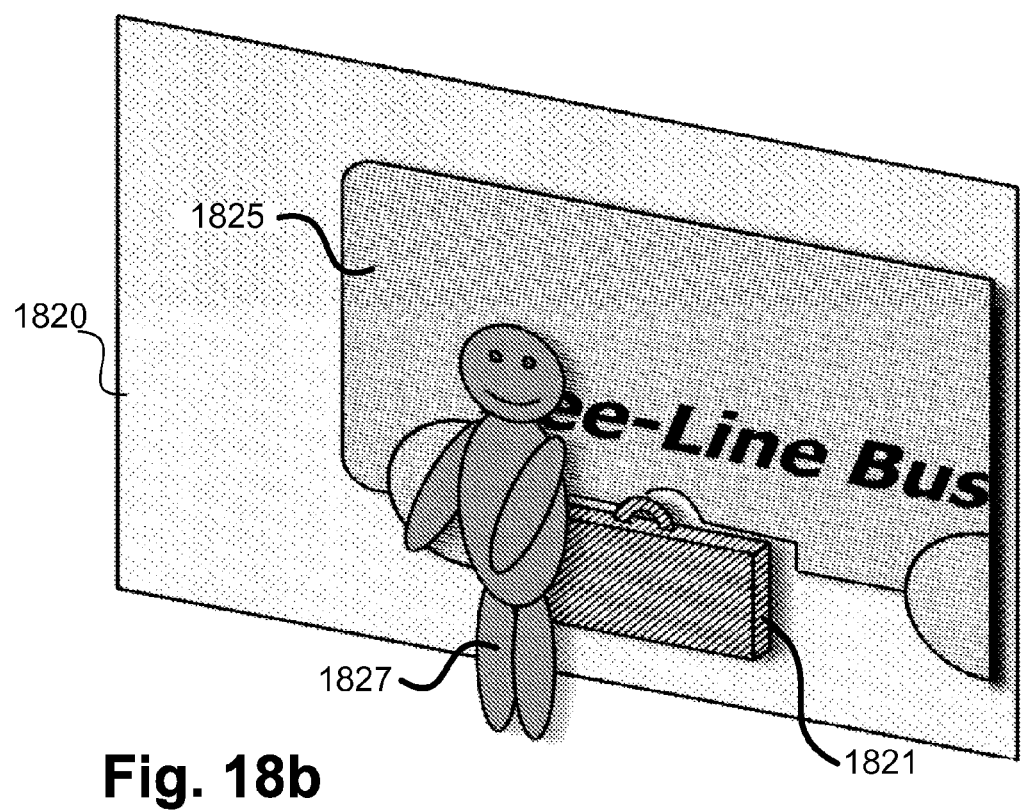

FIGS. 18*a* and 18*b* provide a schematic representations showing the scenario first presented in FIG. 10*a*, 1020, after all of the mode models in the scene model have been processed into layers according to the method of FIG. 17. In FIG. 18*b*, the mode model layers are reconstructed into images of their respective objects by checking the co-occurrence values between adjacent mode models. If the co-occurrence is a maximum of the co-occurrence values between a current mode model and the mode models in the adjacent visual element, as well as a maximum of co-occurrence values between the adjacent mode model and the mode models in the visual element of the current mode model, then the two mode models belong to the same object layer.

FIG. 18*a* shows a layer 1810 of background 1013, a layer 1815 associated with the bus 1015, a layer 1811 associated with the suitcase 1011, and a layer 1817 associated with the person 1017. Each layer exists beyond the extents which were directly observed in the original frame, with many mode models behind others. Note that the layer 1815 associated with the bus 1015 is behind the layer 1811 associated with the suitcase 1011, but that the suitcase 1011 arrived in the scene at an earlier time than the bus 1015, so that there is no layer information for regions of the bus 1015 which are behind the suitcase 1011 because the bus 1015 has never been observed there.

FIG. 18*b* shows the mode model layers reconstructed into their corresponding image elements. The background mode models 1810 have been reconstructed into an image 1820 of the background 1013, the mode models 1811 corresponding to the suitcase 1011 have been reconstructed into an image 1821 of the suitcase, the mode models 1815 corresponding to the bus 1015 have been reconstructed into an image 1825 of the bus 1015, and the mode models 1817 corresponding to the person 1017 have been reconstructed into an image 1827 of the person 1017.

INDUSTRIAL APPLICABILITY

The arrangements described are applicable to the computer and data processing industries and particularly for the imaging and video industries.

The foregoing describes only some embodiments of the present disclosure, and modifications and/or changes can be made thereto without departing from the scope and spirit of the present invention as defined in the claims that follow, the embodiments being illustrative and not restrictive.

The invention claimed is:

1. A computer-implemented method comprising the steps of:
  updating a scene model used for object detection in an image of an image sequence by modifying a relationship between a first mode model associated with a first part of the image and a second mode model associated with a second part of the image which is different from the first part of the image, said updating comprising:
  determining a co-occurrence between the first mode model and the second mode model;
  modifying the relationship between the first mode model and the second mode model, dependent upon the determination of the co-occurrence between the first mode model and the second mode model; and
  updating the scene model based on the modified relationship between the first mode model and the second mode model.

2. A method according to claim 1, further comprising the steps of:
  associating the second mode model with the first mode model in the event that:
    (a) said co-occurrence is a maximum of a first set of co-occurrences between the first mode model and a plurality of mode models in the second part of the image; and
    (b) said co-occurrence is a maximum of a second set of co-occurrences between the second mode model and a plurality of mode models in the first part of the image.

3. A method according to claim 1, further comprising the steps of selecting the second mode model as a scene mode model for the second part of the image in an event that the determined co-occurrence with the first mode model is a maximum of a set of co-occurrences between the first mode model and a plurality of mode models in the second part of the image, said first mode model being a first scene mode model for the first part of the image.

4. A method according to claim 3, further comprising the step of constructing the scene of the image sequence based on the first scene mode model and the selected second mode model.

5. A method according to claim 2, further comprising the step of:
  determining a classification of the first mode model and the second mode model; wherein said modifying step modifies the relationship between the first mode model and the second mode model dependent upon the determination of the classification.

6. The method according to claim 2, wherein the first mode model and the second mode models are associated with spatially neighbouring parts of the image in said scene model.

7. A method according to claim 3, further comprising the step of:
  determining a classification of the first mode model and the second mode model; wherein said modifying step modifies the relationship between the first mode model and the second mode model dependent upon the determination of the classification.

8. The method according to claim 3, wherein the first mode model and the second mode models are associated with spatially neighbouring parts of the image in said scene model.

9. The method according to claim 7, wherein said modifying step depends on the mode models of a pair of mode models sharing a common classification.

10. The method according to claim 7, wherein said classification of each mode model is one of foreground and background.

11. The method according to claim 7, wherein said classification of each mode model relates to at least one of a maturity level and recent activity.

12. The method according to claim 1, wherein the relationship between the mode models relates to a count of a predetermined criterion.

13. The method of claim 12, wherein said count of said predetermined criterion is maintained for spatially neighbouring mode models.

14. A camera system comprising:
an optical system;
a sensor;
a storage device for storing a computer program;
a controller coupled to each of said optical system and said sensor to capture an image sequence, said controller including a processor for executing the computer program, said computer program comprising:
program code for updating a scene model used for object detection in an image of the image sequence by modifying a relationship between a first mode model associated with a first part of the image and a second mode model associated with a second part of the image which is different from the first part of the image, said program code comprising:
code for determining a co-occurrence between a first mode model and a second mode model;
code for modifying the relationship between the first mode model and the second mode model, dependent upon the determination of the co-occurrence between the first mode model and the second mode model; and
code for updating the scene model based on the modified relationship between the first mode model and the second mode model.

15. A camera system according to claim 14, wherein said code for modifying the relationship between the first mode model and the second mode model comprises:
code for associating the second mode model with the first mode model in the event that:
(a) said co-occurrence is a maximum of a first set of co-occurrences between the first mode model and a plurality of mode models in the second part of the image; and
(b) said co-occurrence is a maximum of a second set of co-occurrences between the second mode model and a plurality of mode models in the first part of the image.

16. A camera system according to claim 14, wherein said code for modifying the relationship between the first mode model and the second mode model comprises:
code for selecting the second mode model as a scene mode model for the second part of the image in an event that the determined co-occurrence with the first mode model is a maximum of a set of co-occurrences between the first mode model and a plurality of mode models in the second part of the image, said first mode model being a scene mode model for the first part of the image; and
said computer program further comprising:
program code for constructing the scene of the image sequence based on the first scene mode model and the selected second mode model.

17. A non-transitory computer readable storage medium having recorded thereon a computer program for directing a processor to execute a method to update a scene model, said computer program comprising code for performing the steps of:
updating a scene model used for object detection in an image of an image sequence by modifying a relationship between a first mode model associated with a first part of the image and a second mode model associated with a second part of the image which is different from the first part of the image, said updating comprising:
determining a co-occurrence between a first mode model and a second mode model;
modifying the relationship between the first mode model and the second mode model, dependent upon the determination of the co-occurrence between the first mode model and the second mode model; and
updating the scene model based on the modified relationship between the first mode model and the second mode model.

18. A method according to claim 1, wherein said step of modifying the relationship between the first mode model and the second mode model comprises:
associating the second mode model with the first mode model in the event that:
(a) said co-occurrence meets a first pre-determined criterion of a first set of co-occurrences between the first mode model and a plurality of mode models in the second part of the image; and
(b) said co-occurrence meets a second pre-determined criterion of a second set of co-occurrences between the second mode model and a plurality of mode models in the first part of the image.

19. A method according to claim 18 where said first criterion and said second criterion is at least one of:
(a) a co-occurrence is at least a pre-determined fraction of a maximum of the set of co-occurrences;
(b) a co-occurrence is within a pre-determined threshold amount of a maximum of the set of co-occurrences; and
(c) a co-occurrence is located at least at a pre-determined position in an ordered list of the set of co-occurrences.

20. A method according to claim 4, wherein the step of constructing the scene of the image sequence is performed recursively to fill in a plurality of parts of the image with unknown mode models based on a plurality of parts of the image with known mode models.

* * * * *